US010145940B2

(12) United States Patent
Dunne et al.

(10) Patent No.: US 10,145,940 B2
(45) Date of Patent: Dec. 4, 2018

(54) SYSTEM AND METHOD FOR A RANGEFINDING INSTRUMENT INCORPORATING PULSE AND CONTINUOUS WAVE SIGNAL GENERATING AND PROCESSING TECHNIQUES FOR INCREASED DISTANCE MEASUREMENT ACCURACY

(71) Applicants: Laser Technology, Inc., Centennial, CO (US); Kama-Tech (HK) Limited, Hong Kong (CN)

(72) Inventors: Jeremy G. Dunne, Parker, CO (US); Mark Frischman, Thornhill (CA)

(73) Assignees: LASER TECHNOLOGY, INC., Centennial, CO (US); KAMA-TECH (HK) LIMITED, Hong Kong (CN)

( * ) Notice: Subject to any disclaimer, the term of this patent is extended or adjusted under 35 U.S.C. 154(b) by 268 days.

(21) Appl. No.: 15/140,004

(22) Filed: Apr. 27, 2016

(65) Prior Publication Data

US 2016/0238697 A1    Aug. 18, 2016

Related U.S. Application Data

(63) Continuation of application No. 13/615,143, filed on Sep. 13, 2012, now Pat. No. 9,354,051.

(51) Int. Cl.
*G01C 3/08* (2006.01)
*G01S 7/481* (2006.01)
(Continued)

(52) U.S. Cl.
CPC .............. *G01S 7/4815* (2013.01); *G01C 3/08* (2013.01); *G01C 15/002* (2013.01);
(Continued)

(58) Field of Classification Search
CPC ....................................................... G01C 3/08
See application file for complete search history.

(56) References Cited

U.S. PATENT DOCUMENTS

| 4,533,224 A | 8/1985 | Ou |
| 4,567,446 A | 1/1986 | Konishi |

(Continued)

FOREIGN PATENT DOCUMENTS

| CN | 201876545 U | 6/2011 |
| CN | 101852851 B | 6/2012 |

(Continued)

OTHER PUBLICATIONS

PCT International Search Report and Written Opinion for International Application No. PCT/US2013/059023, dated Dec. 12, 2013, 11 pages.

(Continued)

*Primary Examiner* — Luke D Ratcliffe
(74) *Attorney, Agent, or Firm* — Wiliam J. Kubida; Hogan Lovells US LLP

(57) ABSTRACT

A system and method for a rangefinding instrument incorporating pulse and continuous wave signal generating and processing techniques for increased distance measurement accuracy. The use of the former technique effectively solves the ambiguity issues inherent in the latter while allowing for relatively simple circuit implementations. Thus, a potentially more accurate phase-based distance measurement technique can be utilized which is also completely independent of the maximum range to the target.

19 Claims, 25 Drawing Sheets

(51) Int. Cl.
    G01C 15/00    (2006.01)
    G01S 17/10    (2006.01)
    G01S 17/36    (2006.01)
    G01S 7/48     (2006.01)
    G01S 7/497    (2006.01)

(52) U.S. Cl.
    CPC ............ *G01S 7/4802* (2013.01); *G01S 7/497*
            (2013.01); *G01S 17/10* (2013.01); *G01S*
            *17/105* (2013.01); *G01S 17/36* (2013.01)

(56) References Cited

U.S. PATENT DOCUMENTS

| | | |
|---|---|---|
| 5,146,079 A | 9/1992 | Lisco |
| 5,477,321 A | 12/1995 | Johnson |
| 5,574,552 A | 11/1996 | Dunne |
| 5,612,779 A | 3/1997 | Dunne |
| 5,652,651 A | 7/1997 | Dunne |
| 5,703,678 A | 12/1997 | Dunne |
| 5,880,821 A | 3/1999 | Dunne |
| 6,043,868 A | 3/2000 | Dunne |
| 6,057,910 A | 5/2000 | Dunne |
| 6,226,077 B1 | 5/2001 | Dunne |
| 6,445,444 B2 | 9/2002 | Dunne |
| 6,608,677 B1 | 8/2003 | Ray et al. |
| 6,658,329 B1 | 12/2003 | Howard et al. |
| 6,756,578 B1 | 6/2004 | Kaiser |
| 7,301,616 B2 | 11/2007 | Foley |
| 7,667,598 B2 | 2/2010 | Yenisch et al. |
| 7,852,461 B2 | 12/2010 | Yahav |
| 9,213,101 B2 | 12/2015 | Dunne |
| 2001/0012104 A1 | 8/2001 | Dunne |
| 2002/0190890 A1 | 12/2002 | Pergande |
| 2003/0076484 A1* | 4/2003 | Bamji .................... G01S 17/36 356/5.1 |
| 2005/0174560 A1 | 8/2005 | Imber et al. |
| 2005/0200831 A1 | 9/2005 | Staley, III et al. |
| 2005/0275826 A1 | 12/2005 | Ohtomo et al. |
| 2006/0247608 A1 | 11/2006 | Hahn et al. |
| 2006/0285233 A1 | 12/2006 | Dunne |
| 2007/0127009 A1 | 6/2007 | Chen et al. |
| 2007/0182952 A1 | 8/2007 | Nishita et al. |
| 2008/0088818 A1* | 4/2008 | Mori .................... G01S 17/10 356/5.1 |
| 2008/0218743 A1 | 9/2008 | Stetten et al. |
| 2009/0046271 A1 | 2/2009 | Constantikes |
| 2010/0045966 A1 | 2/2010 | Cauquy et al. |
| 2010/0271616 A1 | 10/2010 | Suzuki et al. |
| 2011/0131824 A1 | 6/2011 | Yanobe et al. |
| 2011/0216305 A1 | 9/2011 | Hayashi et al. |
| 2011/0279808 A1 | 11/2011 | Dunne |
| 2011/0292371 A1 | 12/2011 | Chang |
| 2012/0140201 A1 | 6/2012 | Grauslys et al. |
| 2012/0262730 A1 | 10/2012 | Brown et al. |
| 2014/0071425 A1 | 3/2014 | Dunne |
| 2014/0307248 A1 | 10/2014 | Giger et al. |

FOREIGN PATENT DOCUMENTS

| | | |
|---|---|---|
| EP | 1102034 B1 | 5/2001 |
| EP | 1903302 A2 | 3/2008 |
| JP | H09304055 A | 11/1997 |
| KR | 20070103533 A | 10/2007 |
| KR | 20090104326 A | 10/2009 |
| KR | 20090121609 A | 11/2009 |

OTHER PUBLICATIONS

PCT International Search Report and Written Opinion for International Application No. PCT/US2013/059037, dated Dec. 16, 2013, 14 pages.
PCT Preliminary Report on Patentability for International Application No. PCT/US2013/059032, dated Mar. 26, 2015, 13 pages.
PCT International Search Report and Written Opinion for International No. PCT/US15/54167, dated Jan. 11, 2016, 10 pages.
Extended European Search Report for Application No. 13837644.7 dated Apr. 1, 2016 (8 pages).
Australian Patent Examination Report No. 1 for Patent Application No. 2013315687, dated Sep. 19, 2016, 2 pgs.

* cited by examiner

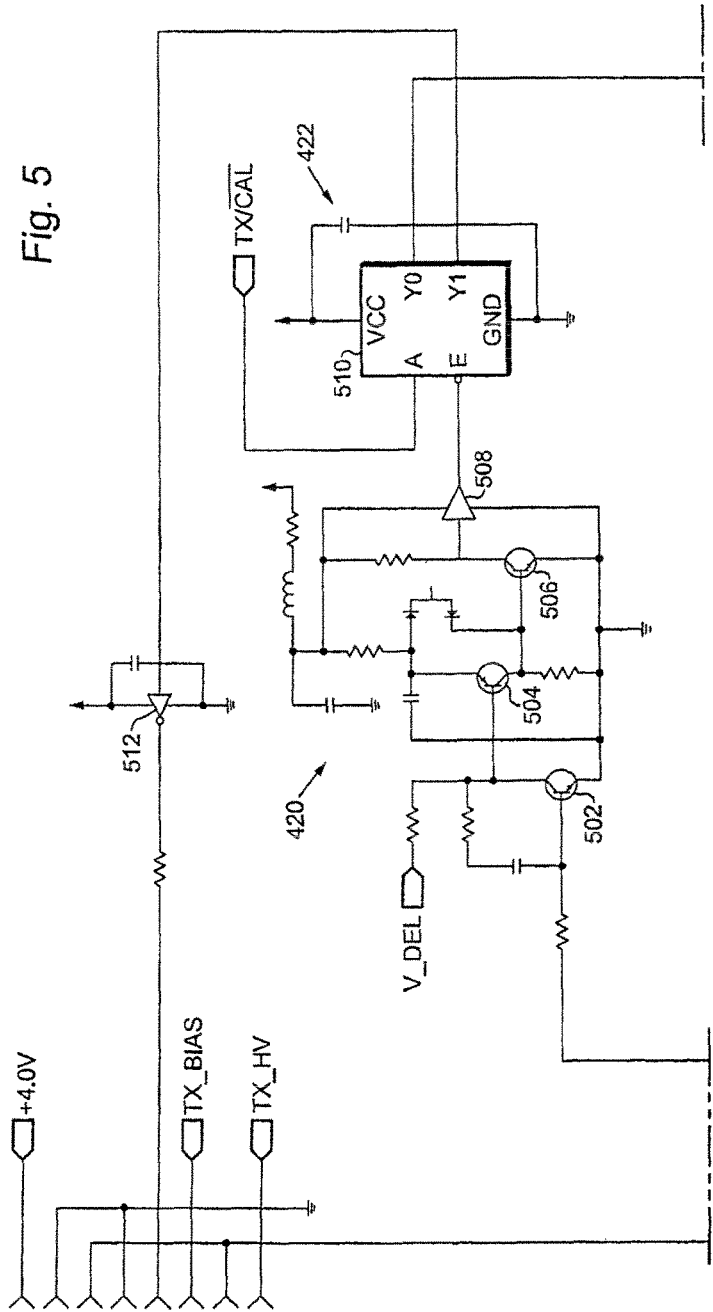

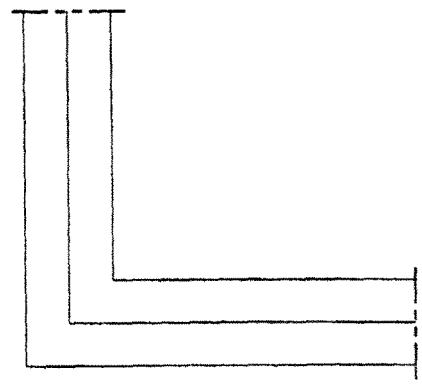
Fig. 6
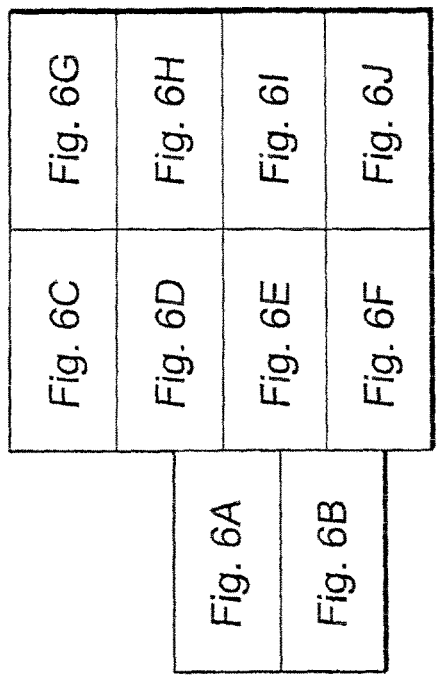
Fig. 6A
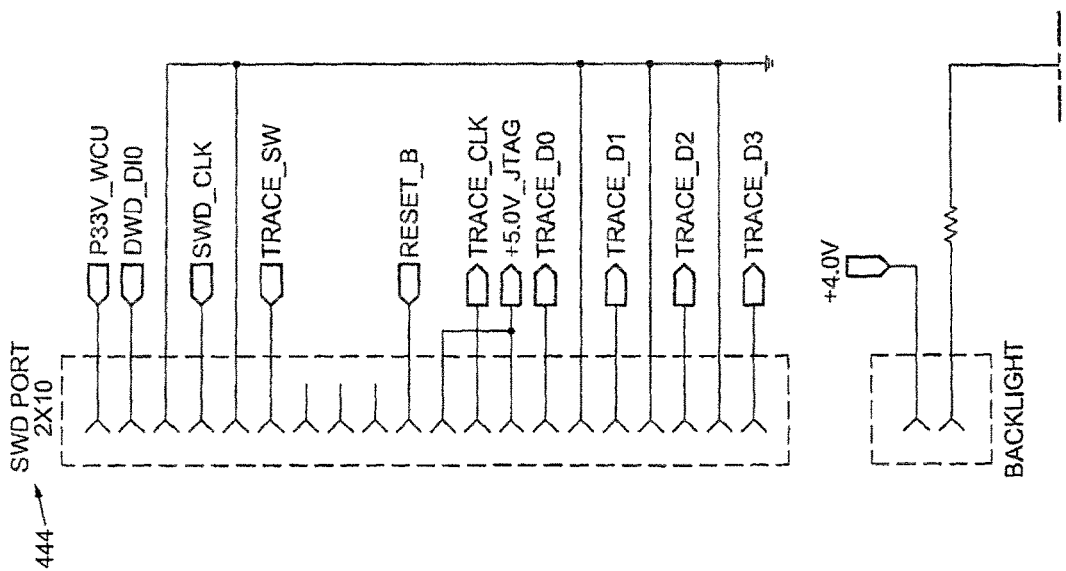

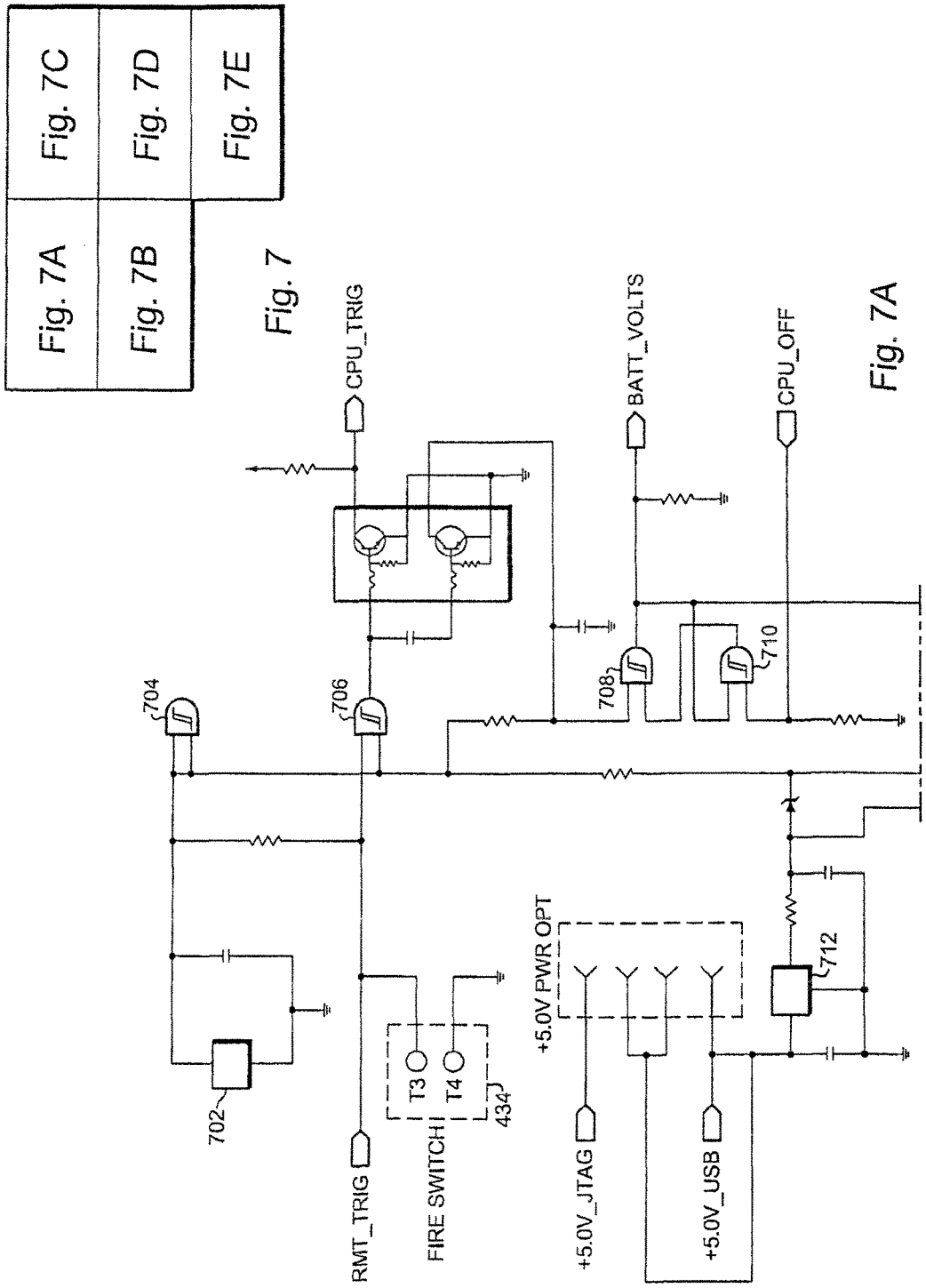

SYSTEM AND METHOD FOR A RANGEFINDING INSTRUMENT INCORPORATING PULSE AND CONTINUOUS WAVE SIGNAL GENERATING AND PROCESSING TECHNIQUES FOR INCREASED DISTANCE MEASUREMENT ACCURACY

CROSS REFERENCE TO RELATED PATENT APPLICATIONS

The present invention claims priority from, and is a continuation of U.S. patent application Ser. No. 13/615,143 filed on Sep. 13, 2012, and is related to the subject matter disclosed in U.S. patent application Ser. No. 13/615,172 for: "System and Method for Superimposing a Virtual Aiming Mechanism with a Projected System Beam in a Compact Laser-Based Rangefinding Instrument" and Ser. No. 13/615,215 for: "Self-Aligned Aiming System and Technique for a Laser Rangefinder Incorporating a Retroreflector" both assigned to the assignees hereof and filed on even date herewith, the disclosures of which are herein specifically incorporated by this reference in their entirety.

BACKGROUND OF THE INVENTION

The present invention relates, in general, to the field of laser rangefinders and rangefinding instruments. More particularly, the present invention relates to a system and method for a rangefinding instrument incorporating pulse and continuous wave signal generating and processing techniques for increased distance measurement accuracy.

Numerous types of ranging devices have been introduced for measuring distances in situations in which traditional tape measures have previously been employed. For such applications, compact design and cost considerations are important factors in addition to ease of use and overall device accuracy.

Certain of these designs are pulse-based laser systems which utilize a time-of-flight measurement technique to compute the distance to a particular target based on the time it takes for a transmitted pulse to reach the target and be reflected back therefrom. Among the disadvantages of such pulse-based devices is that, in order to achieve high levels of accuracy, rather complicated timing circuitry is required in addition to ensuring that the device remains properly calibrated for the then current operating conditions. Representative circuitry and associated signal processing techniques for such a pulse-based laser rangefinder are disclosed, for example, in the following United States Patents assigned to Laser Technology, Inc., assignee of the present invention: U.S. Pat. Nos. 5,574,552; 5,612,779; 5,652,651; 5,703,678; 5,880,821; 6,057,910; 6,226,077 and 6,445,444. The disclosures of these patents are herein specifically incorporated by this reference in their entirety.

An alternative technique for measuring distances employs phase-based techniques in which a continuous wave (CW) or discreet bursts of essentially continuous waves signals are directed toward a target and the phase of the backscatter signal that is reflected back therefrom is determined. Among the advantages of such CW systems is that, for similar or lower costs than a pulse-based system, it is possible to achieve potentially higher accuracy with simpler electronics due, at least in part, to the fact that the small CW diodes will turn "on" and "off" more quickly than the larger infrared (IR) pulse diodes used in pulse-based systems.

However, among the difficulties inherent in implementations of such phase-based systems is that the unambiguous range of the instrument is the period of the CW signal divided by two. In other words, assuming a 50 MHz signal which has a cycle time of 20 nsec., a flight distance of about 10 feet is covered so it is not possible to discriminate based on that information alone whether the target is at 10 feet, 20 feet, 30 feet or the like. Known techniques for dealing with this ambiguity include generating and transmitting multiple frequencies or dividing down the device clock frequency to produce varying transmission frequencies. All of these solutions require ever more complicated circuitry and the problem they attempt to solve becomes increasingly more difficult to address as the distance from the target increases.

A comparison of pulse-based systems with phase-based systems shows that the former can effectively distinguish between dust or other debris or interference between the signal source and the intended target. In other words, a pulse-based system can distinguish between multiple targets. On the other hand, in phase-based systems the phase return is the vector sum of the backscatter from the target and the interfering dust or other object and there is no easy way of discriminating between the two.

Therefore, a need exists for a compact, low cost rangefinding instrument which is inexpensive, reliable and highly accurate and would essentially provide the benefits of both pulse-based and phase-based ranging systems while compensating for, or overcoming, the inherent disadvantages of the other.

SUMMARY OF THE INVENTION

Disclosed herein is a system and method for a rangefinding instrument incorporating pulse and continuous wave signal generating and processing techniques for increased distance measurement accuracy. The use of the former technique effectively solves the ambiguity issues inherent in the latter while allowing for relatively simple circuit implementations. Thus, a potentially more accurate phase-based distance measurement technique can be utilized which is also completely independent of the maximum range to the target. Moreover, under conditions in which the target cannot be discriminated from any interfering dust or other object with a phase-based ranging technique, the pulse-based system can be employed and a warning flagged to the user as to the then current accuracy of the phase-based system.

Essentially then, one system can be used to calibrate the other and to compensate for the inherent disadvantages of the other. Other advantages of the system and method of the present invention which employs a pulse-based as well as a phase-based distance measuring technique are more fully disclosed and claimed in the aforementioned co-pending United States Patent Application for "System and Method for Superimposing a Virtual Aiming Mechanism with a Projected System Beam in a Compact Laser-Based Rangefinding Instrument".

Particularly disclosed herein is a rangefinding instrument which comprises a pulse-based signal transmission system, a phase-based signal transmission system and a distance computing circuit coupled to the pulse-based and phase-based transmission systems which is operative to determine a range to a target based upon a time of flight of the pulse-based signals and a phase shift of the phase-based signals reflected from the target.

Also particularly disclosed herein is a method for determining range to a target which comprises transmitting a pulse-based signal to the target, transmitting a phase-based signal to the target and determining a range to the target based upon a time of flight of the pulse-based signal and a phase shift of the phase-based signal reflected from the target.

Further disclosed herein is a method for measuring distance comprising emitting a continuous wave laser beam toward a target, emitting a pulsed laser beam toward the target and receiving reflections of the continuous wave laser beam and the pulsed laser beam from said target. Distance to the target is then computed based on the emitted and reflected continuous wave and pulsed laser beams and the computed distance based on the pulsed laser beam is utilized to resolve phase ambiguity in the computed distance based on said continuous wave laser beam.

Still further provided herein is a method for measuring a distance comprising emitting a continuous wave laser beam toward a target, also emitting a pulsed laser beam toward the target and utilizing both the continuous wave and pulsed laser beams to determine the distance to the target.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein:

FIGS. 5A through 5G inclusive illustrate greater structural detail of the representative device of the preceding figure including portions of the pulse and continuous wave generating portions;

FIGS. 6A through 6J inclusive illustrate greater structural detail of the representative device of the preceding figures inclusive of the microcontroller and associated circuitry; and FIGS. 7A through 7E inclusive illustrate further structural detail of the representative device of the preceding figures inclusive of portions of the device power supply and associated circuitry.

DESCRIPTION OF A REPRESENTATIVE EMBODIMENT

Figure 1:
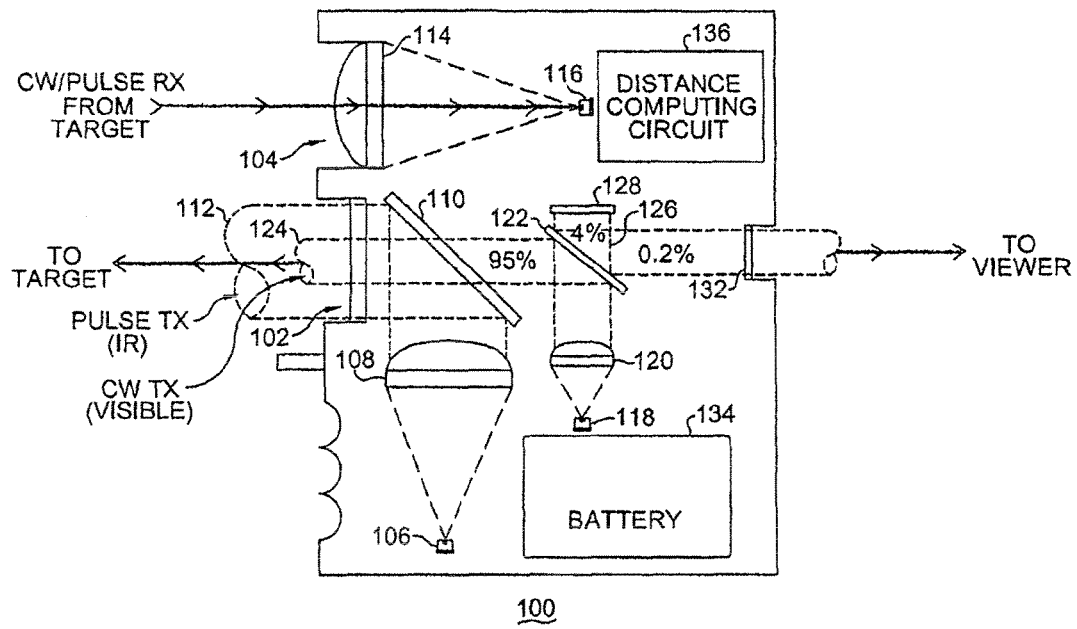
FIG. 1 is a simplified illustration of the optical and signal paths in a representative embodiment of a possible implementation of the system and method of the present invention for a rangefinding instrument incorporating pulse and continuous wave signal generating and processing techniques for increased distance measurement accuracy.

With reference now to FIG. 1, a simplified illustration of the optical and signal paths of a representative embodiment of the system and method of the present invention is shown in the form of a pulse-based and phase-based rangefinding instrument 100. The system and method of the present invention is operative to increase distance measurement accuracy in a rangefinding instrument by incorporating pulse and continuous wave signal generating and processing techniques.

The instrument 100, in pertinent part, comprises a pulsed laser beam and phase-based (CW) optical signal transmission aperture 102 and a reflected pulsed laser beam and continuous wave signal reception aperture 104, the latter for reception of both pulse-based and phase-based signals transmitted to a selected target from the transmission aperture 102 and reflected back to the instrument 100 from a target. The laser transmission system of the instrument 100 comprises a laser emitting diode 106 (or other similar signal producing mechanism) and a collimating lens 108. Laser light, typically infrared, is passed through the lens 108 to a mirror 110 whereupon it is redirected 90° toward the selected target through the laser transmission aperture 102 in the form of a laser beam 112. As previously described, laser light reflected from the target is received through the reception aperture 104 as well as lens 114 to be focused on a signal detection diode 116 or similar device comprising a part of the pulse-based and phase-based receiving system of the instrument 100.

The instrument 100 also comprises a phase-based, continuous wave, visible light source 118 which is positioned adjacent a collimating lens 120 for directing light towards a partial (e.g. dichroic) mirror 122 positioned substantially as shown to redirect incident light 90° along a beam path 124 substantially coaxially with the laser beam 112. In the particular implementation shown, approximately 95% of the visible light incident upon the mirror 122 is reflected towards the target along beam path 124 while about 4% is passed through the dichroic 122 mirror towards a reflective surface 128 along beam path 126. Of the approximately 4% of the visible light incident upon the reflective surface 128 something on the order of about 0.2% is then redirected back towards the other side of the dichroic mirror 122 and then redirected 90° towards a viewer/user of the instrument 100 along path 130 and through viewing aperture 132.

Power for the electronic portions of the transmission, reception and other systems of the instrument 100 may be conveniently provided by a battery 134 as shown. A distance computing circuit 136 is operatively coupled to the pulse-based and phase-based signal transmission section including the laser emitting diode 106 and light source 118 as well as a pulse-based and phase-based beam reception section including signal detection diode 116 to calculate the distance to the target as will be more fully described hereinafter.

Figure 2:
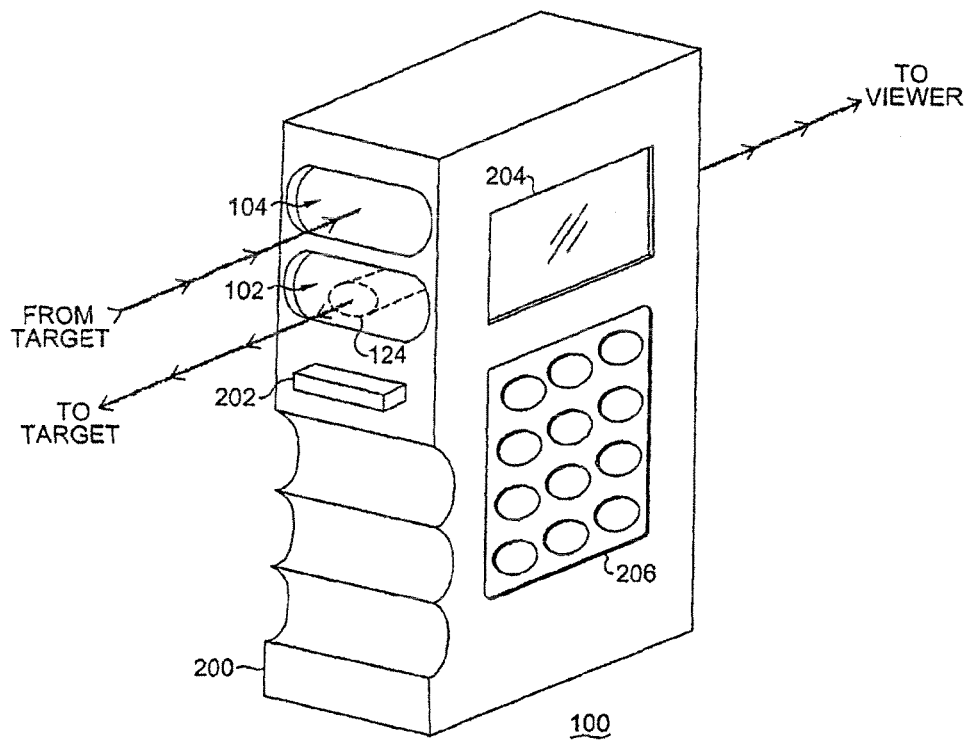
FIG. 2 is an isometric view of the representative embodiment of the instrument of the preceding figure illustrating, for example, a display and data input key pad.

With reference additionally now to FIG. 2, an isometric view of the representative embodiment of the instrument 100 in the preceding figure is shown. Like structure to that previously shown and described with respect to the preceding figure is like numbered and the foregoing description thereof shall suffice herefor.

The instrument 100 comprises a hand held housing 200 for containing the laser, optical and electronic systems previously described as well as a user actuatable switch 202. A display 204 may be utilized to indicate range, operational mode or other pertinent data to a user who can also enter data to the instrument 100 through, for example, a keypad 206. The display 204 and keypad 206 are also operatively coupled to the distance computing circuit 136.

Figure 3:
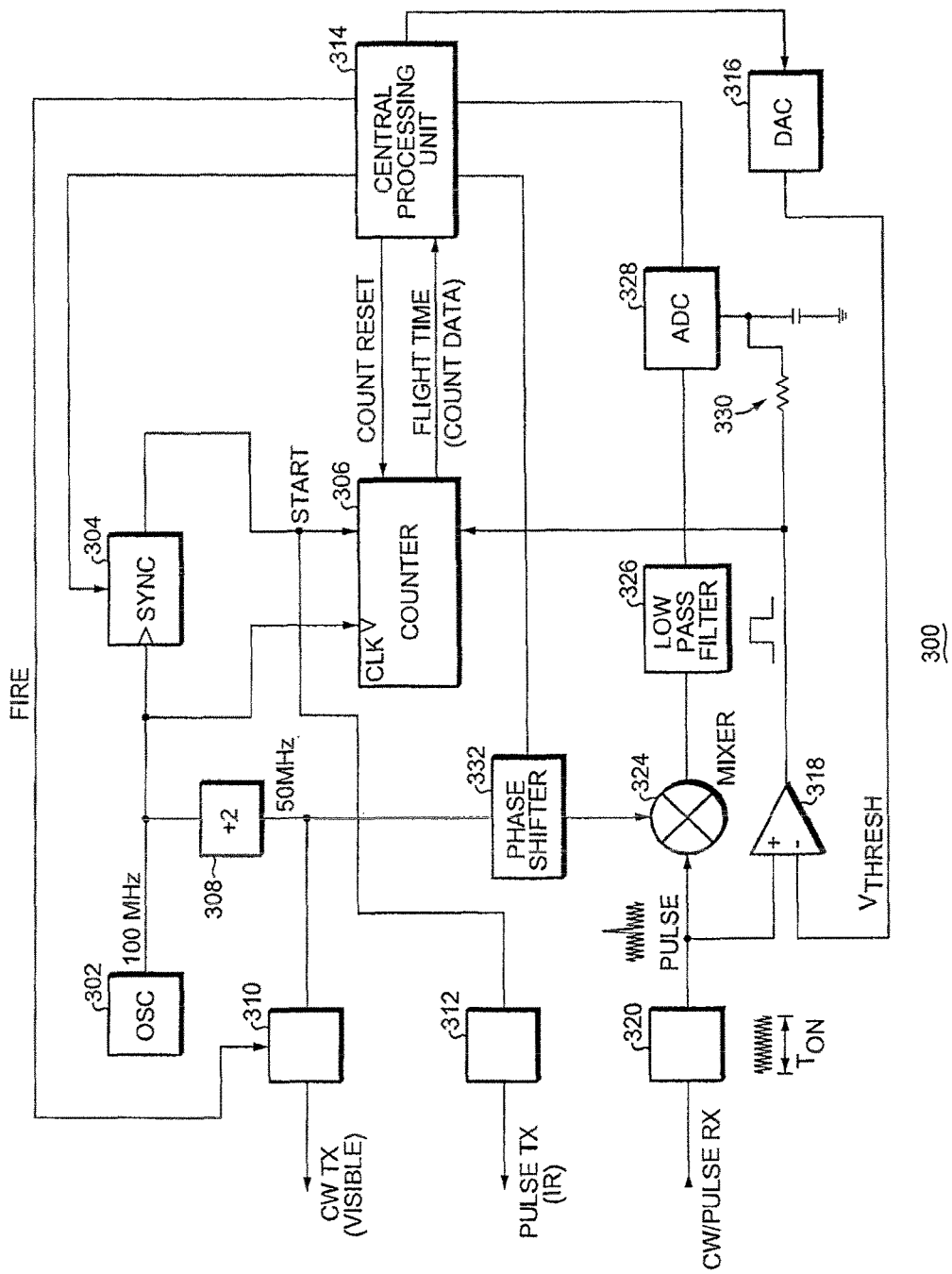
FIG. 3 is a functional block diagram of a possible embodiment of circuitry for implementing the pulse and continuous wave signal generating and processing techniques of the present invention.

With reference additionally now to FIG. 3, a functional block diagram of a possible implementation of distance computing circuit 136 (FIG. 1) in the form of a circuit 300 for implementing the pulse and continuous wave signal generating and processing techniques of the present invention is shown. The circuit 300 comprises an oscillator 302 which may provide an output signal with a frequency of, for example, substantially 100 MHz to a synchronizer block 304 as well as the clock (CLK) input of a counter 306. The synchronizer block 304 further provides a START signal input to the counter 306.

The 100 MHz output signal from the oscillator 302 is also input to a divide-by-two function 308 to reduce the frequency to substantially 50 MHz for input to a continuous wave transmit (CW TX) signal emitter 310 and a phase shifter 332. The continuous wave signal emitter generally corresponds with the visible light source 118 of FIG. 1 and the signal emitted may comprise visible light. The START signal output of the synchronizer block 304 is also supplied to a pulse signal emitter 312 which may comprise an infrared (IR) laser light emitting diode generally corresponding to laser emitting diode 106 of FIG. 1.

The counter 306 provides flight time (count data) information to a central processing unit (CPU) 314 which, in turn, provides back a count reset signal to the counter 306. The central processing unit 314 provides a control signal to the synchronizer block 304 as well as a FIRE signal to the CW TX signal emitter 310. In addition, the central processing unit 314 provides an input to the phase shifter 332 as well as a digital signal input to a digital-to-analog converter (DAC) 316. Output of the DAC 316 is provided as a threshold voltage $V_{THRESH}$ to the "−" input of a comparator 318. The "+" input of the comparator 318 receives a PULSE signal input from a CW/PULSE Receiver (RX) 320 which senses the CW and PULSE signals emitted by emitters 310 and 312 as reflected back from a target. The PULSE signal is also applied to a mixer 324 which is also coupled to the output of the phase shifter 330.

Output of the mixer 324 is passed through a low pass filter 326 for input to an analog-to-digital converter (ADC) 328 for application of a digital signal to the central processing unit 314. The digital signal comprises digital data representative of the phase angle of the signal from the target and allows adjustment of the comparator 318 threshold in order to optimize the detector sensitivity. Output of the comparator 318 in the form of a digital pulse is furnished to the counter 306 in the form of a STOP signal as well as to a resistive/capacitive network 330 coupled to the ADC 328.

In operation, the pulse-based system of the circuit 100 fires off high-intensity pulses (typically IR) of short duration (typically a few nanoseconds) toward a target and then measures the direct time of flight of a particular pulse from the target. This provides a method of measuring the flight time of the pulse, and hence, determining the range to the target without any ambiguity. As mentioned previously, the downside of such a system is that in order to achieve high levels of accuracy, relatively complex circuitry and precise calibration is required.

With phase-based systems, lower cost circuitry can employed along with the possibility of achieving higher accuracy in the measurement of distance as the linear operating range is a much broader range of distances than that of pulse-based systems. With the phase-based portion of the circuit 300, a continuous wave, or discreet bursts of essentially continuous wave signals, is directed to the target. At a 50 MHz operating frequency out of the divide-by-two function 308, a discreet series of CW pulses is output from the CW TX signal emitter 310 and gated "on" and "off" under control of the CPU 314. These signals will generally have a 50% duty cycle to minimize errors in the return path which results in being "on" for about 10 nsec. and "off" for the same length of time so the duration of the wave-train is relatively long compared to the spacing between the individual pulses that are being emitted. In comparison, the output of the pulse signal emitter 312 is a series of pulses of approximately 10 nsec. duration emitted every few milliseconds.

Reflected pulses from the target are detected by the circuit 300 when they exceed a determined threshold and time of flight is measured by starting the counter 306 at the exact moment a pulse is fired from the pulse signal emitter 312 and stopping it at the precise moment when the corresponding reflected pulse is received. The resultant count stored in the counter 306 is then provided to the central processing unit 314 to compute distance to the target. By controlling the threshold, any noise in the returned signal can be integrated to optimize the sensitivity of the system.

With the phase-based portion of the circuit 300, a continuous wave signal is directed to the target and that same signal is reflected back to the instrument with a certain determinable phase shift caused by the time delay to and from the target. The circuit 300 mixes the return signal from the target using mixer 324 with a phase-shifted version of the signal that was emitted from the CW TX signal emitter 310 at the output of the phase shifter 332. That is then applied through the low pass filter 326 to provide a voltage to the input of the ADC 328. In this manner, both the amplitude and phase of the received signal can be determined relative to the transmitted signal.

Functionally, an instrument incorporating the features of circuit 300 can determine from the pulsed signal data whether or not a confused target has been encountered due to intervening dust or other inferring objects, should multiple pulses be encountered. If multiple pulses are not encountered, an assumption can be made that there is a clean line of sight to the target and back. Under those conditions, the more accurate phase measurement technique can be employed to calibrate pulse range such that when the target does become intermittent, accuracy is maintained on the pulse measurement because the range accuracy of the pulse-based system has been improved by the prior measurement of the phase-based system. In other words, the pulse-based system serves as a monitor for a "clean" target, and when such is encountered, it can update its calibration tables from the more accurate phase measurement.

Figure 4:
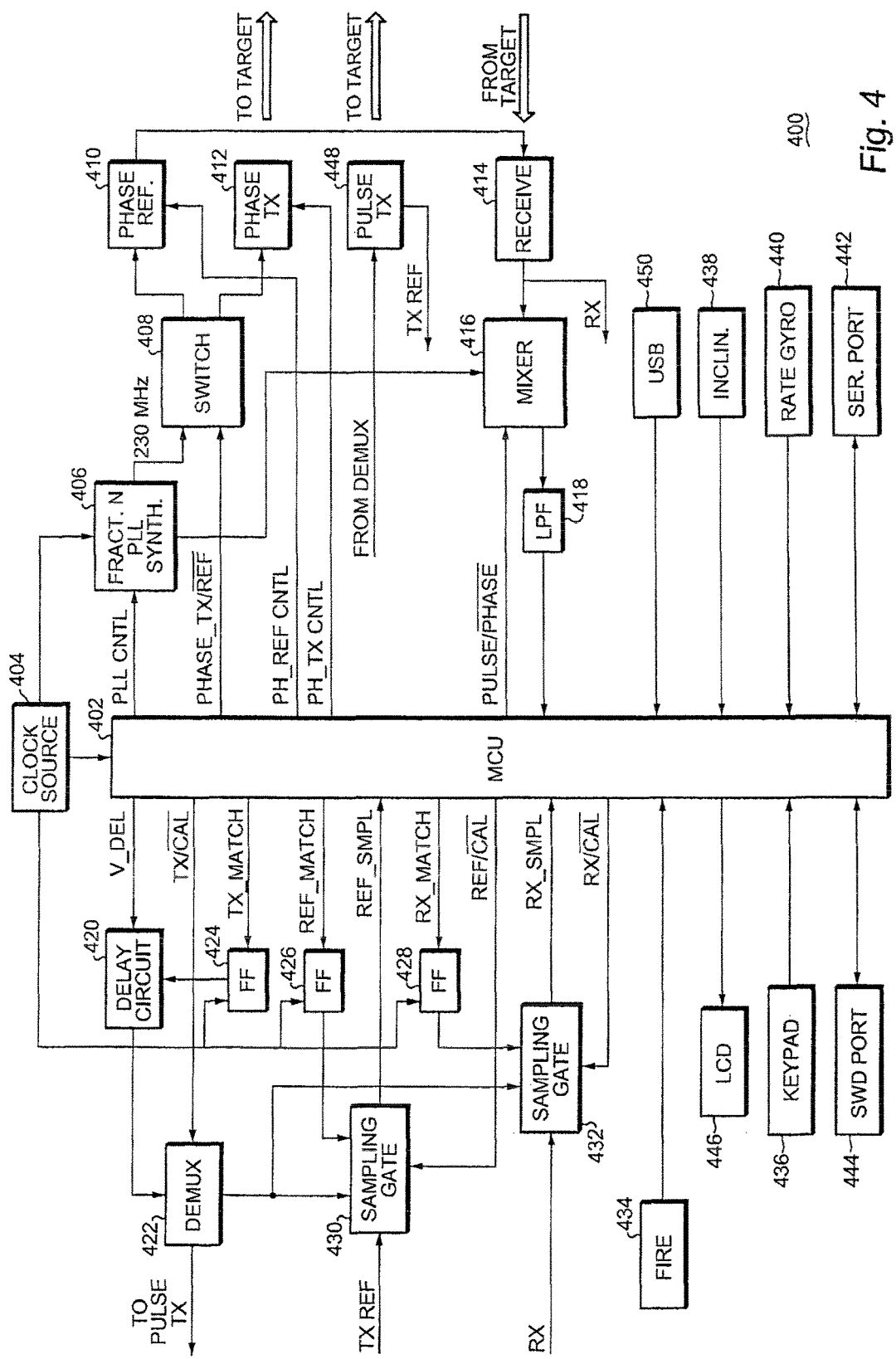
FIG. 4 is a functional block diagram of another possible embodiment of circuitry for implementing the pulse and continuous wave signal generating and processing techniques of the present invention.

With reference additionally now to FIG. 4, an alternative representative embodiment of a laser distance measuring device 400 in accordance with the present invention is shown. The device 400 comprises an MCU 402 with, for example, an on board digital-to-analog converter (DAC) which receives clocking signals from clock source 404 as shown. The MCU 402 provides a number of control inputs, herein collectively labeled as PLL_CNTL, to a fractional N phase-locked loop (PLL) synthesis circuit 406 as will be shown and described more fully hereinafter. The fractional N PLL synthesis circuit 406 provides output frequencies of 230.0 MHz and 230.01 MHz, the latter being at a 10.0 KHz differential with respect to the former.

The 230.0 MHz frequency signal is supplied as one input to a switch 408 which also receives a PHASE_TX/REF signal from the MCU 402. Outputs of the switch 408 are supplied to identical phase reference and phase transmission blocks 410, 412 as will also be described more fully hereinafter. It should be noted that in other embodiments of the present invention, the presence of the switch 408 may be obviated through the use, for example, of the Y4 and Y5 outputs of the fractional N PLL synthesis circuit 406 when a CDCE925/CDCEL925 device available from Texas Instruments, Inc. is utilized. In this instance, the Y4 output can be supplied to the phase reference block 410 and the Y5 output can be supplied to the phase transmission block 412.

The phase reference block 410 receives a number of control inputs, herein collectively labeled as PH_REF CNTL, from the MCU 402 which also provides a number of control inputs, herein collectively labeled as PH_TX CNTL, to the phase transmission block 412. The phase reference block 410 provides signal directly to the laser receiver 414 as shown. The phase transmission block 412 emits a continuous wave laser signal toward a target from which a return signal is subsequently received by the laser receiver 414.

The laser receiver 414 provides an RX signal to other of the device 400 circuitry including a mixer 416 which also receives the 230.01 MHz output signal from the fractional N PLL synthesis circuit 406 and a PULSE/$\overline{PHASE}$ signal from the MCU 402. Output from the mixer 416 is passed through a low pass filter (LPF) network 418 to the MCU 402.

The clock source 404 also provides a clocking signal to a series of flip-flops 424, 426 and 428 which will be illustrated and described in more detail hereinafter. The delay circuit 420 receives a V_DEL signal from the MCU 402 and provides an output to a demultiplexer 422 as shown which also receives a transmission/calibration signal TX/$\overline{CAL}$ from the MCU 402. The series of flip-flops 424, 426 and 428 receive signals from the MCU 402 denominated as TX_MATCH, REF_MATCH and RX_MATCH respectively. Output from flip-flop 424 is supplied to the delay circuit 420 while output of flip-flop 426 is supplied as one input to a sampling gate 430 which also receives an output from the demultiplexer 422 and a TX REF signal. Output from flip-flop 428 is supplied as one input to sampling gate 432 which is also coupled to an output of the demultiplexer 422 and also receives a RX signal from the receiver 414. The demultiplexer 422 provides a driving signal to a pulse transmission block 448 which may function, for example, as disclosed in U.S. Pat. Nos. 5,612,779; 6,057,910 and 6,226,077 assigned to Laser Technology, Inc., assignee of the present invention, the disclosures of which are herein incorporated by this reference in their entirety.

Activation of the device 400 is accomplished by a user aiming it at a target and activating a fire button 434. Additional associated devices and circuitry for the device 400 include a keypad 436, an inclinometer 438 and rate gyro 440 as well as a serial port 442 and serial wire debug (SWD) port 444. The inclinometer, or tilt sensor, 438 may be conveniently furnished as an accelerometer as will be more fully described hereinafter. A universal serial bus (USB) port 450 may also be coupled to the MCU as indicated. Information regarding distance to a target point as well as other user information such as battery status, head-up display, aiming reticle, operational mode and the like may be displayed in a liquid crystal display (LCD) 446.

With reference additionally now to FIGS. 5A through 5G inclusive, greater structural detail of the representative device 400 of the preceding figure is shown. With respect to FIG. 5A in particular, elements of the delay circuit 420 and demultiplexer 422 are shown. The active components of the delay circuit 420 and associated circuitry comprise small signal NPN transistors 502 and 506 which may be conveniently furnished as MMBT3904 devices while transistor 504 may be furnished as a small signal PNP transistor such as an MMBT3906 device. Both devices are available from Diodes, Inc. Demultiplexer 422 may comprise an SN74LVC1G19 1-of-2 decoder/demultiplexer 510 while inverter 512 may be an SN74LVC1G04 single inverter gate. Both devices are available from Texas Instruments, Inc.

Figure 5B:
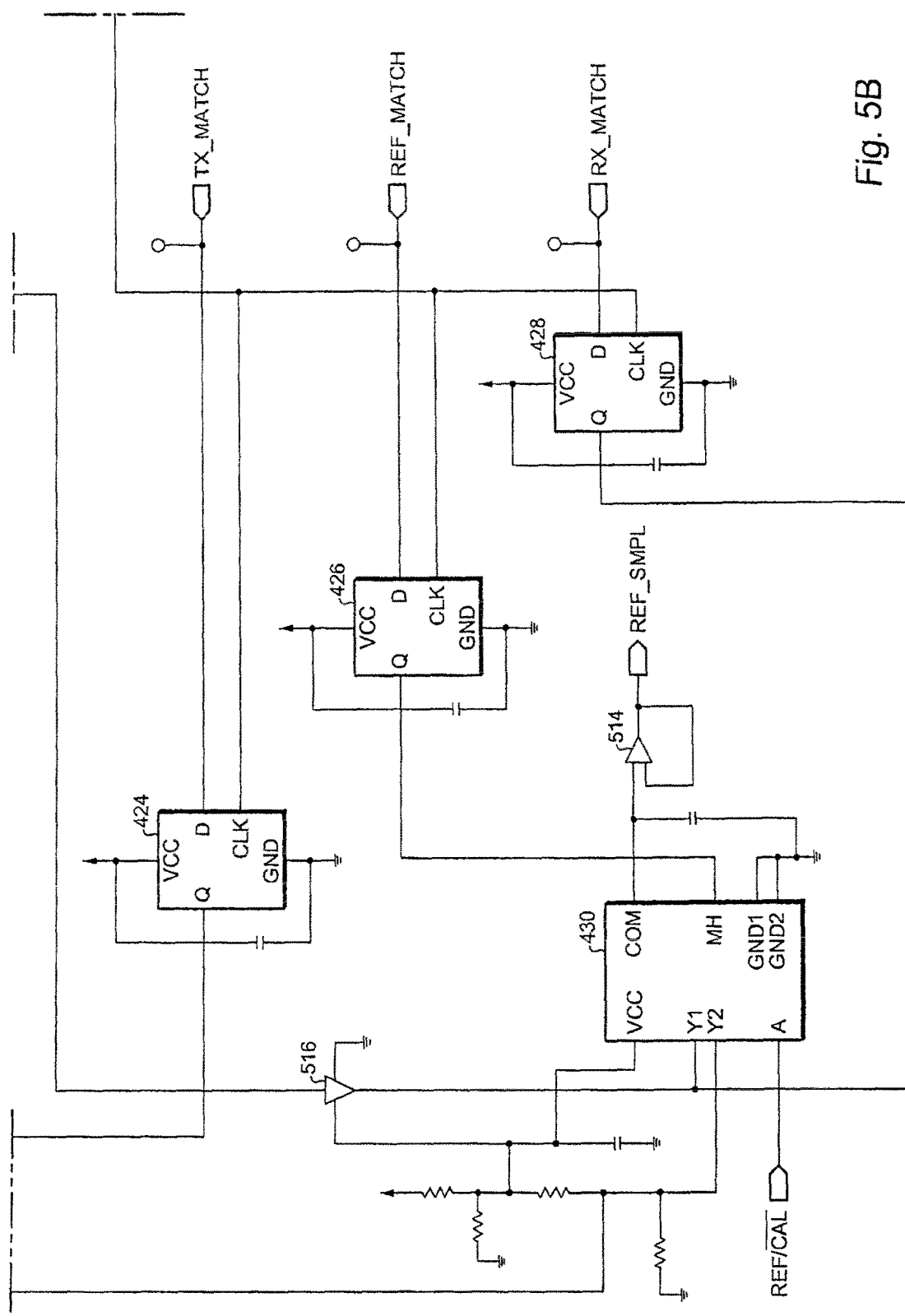

With reference particularly to FIG. 5B, the circuitry associated with flip-flops 424, 426 and 428 as well as sampling gate 430 (FIG. 4) are shown. Flip-flops 424, 426 and 428 may comprise SN74LVC1G79 single positive-edge-triggered D-type flip-flops while buffer 516 may comprise an SN74AUC1G17 single Schmitt-trigger buffer. Sampling gate, or track and hold circuit, 430 may also conveniently comprise an SN74AUC2G53 single-pole double-throw (SPDT) analog switch or 2:1 analog multiplexer/demultiplexer. All of these devices are available from Texas Instruments, Inc. The storage capacitor coupled between the COM output of the sampling gate 430 and circuit ground is operative with a CMOS operational amplifier (or field effect transistor) 514 to provide a voltage REF_SMPL the instant the switch opens.

Figure 5C:
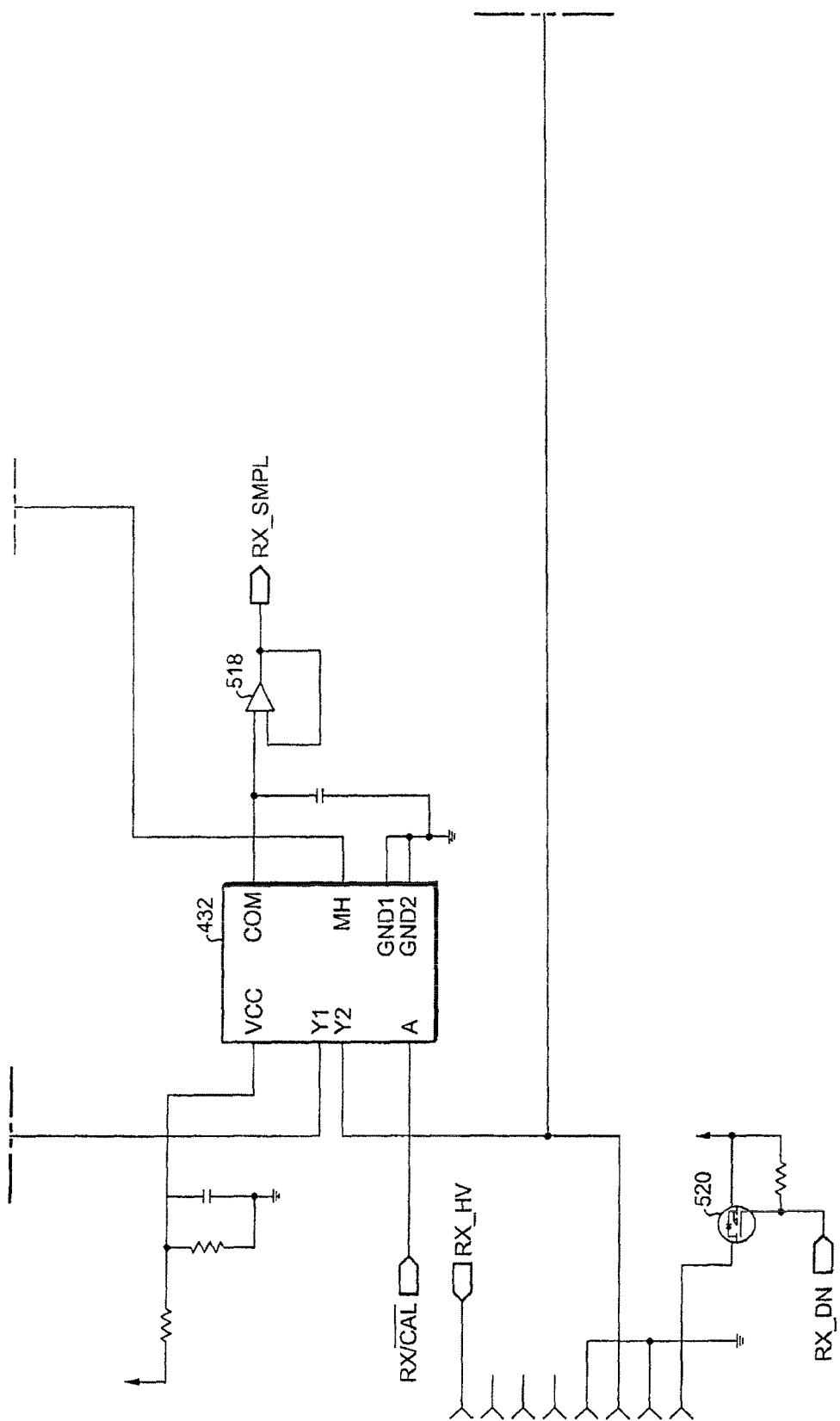

Referring additionally now to FIG. 5C the circuitry associated with sampling gate 432 (FIG. 4) is shown in greater detail. Sampling gate 432 may be furnished as an SN74AUC2G53 device as sampling gate 430 of the preceding figure. Operational amplifier (op amp) 518, as op amp 514, may be an MCP6284 rail-to-rail op amp available from Microchip Technology, Inc. while transistor 520 may be furnished as a DMP216 P-channel enhancement mode MOSFET available from Diodes, Inc. As with the preceding figure, the storage capacitor coupled between the COM output of the sampling gate 432 and circuit ground is operative with a CMOS operational amplifier (or field effect transistor) 518 to provide a voltage RX_SMPL the instant the switch opens.

Figure 5D:
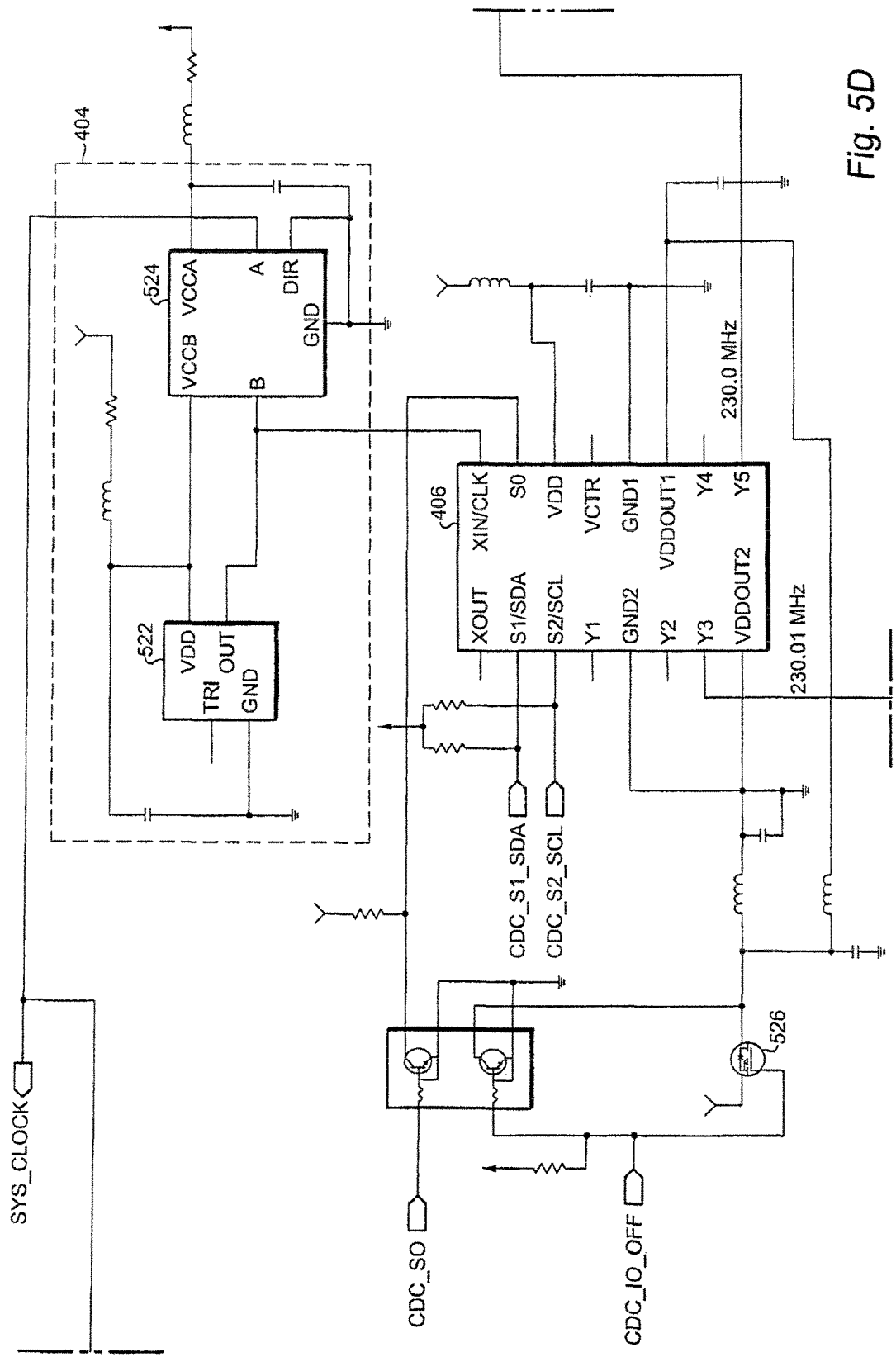

With particular reference now to FIG. 5D, the clock source 404 and fractional N PLL synthesis circuit 406 (FIG. 4) and associated circuitry are shown in greater detail. The clock source 404 comprises, in pertinent part, an oscillator chip 522 which may be furnished as an ASFL3 1.8v LVHCMOS compatible SMD crystal clock oscillator available from Abracon Corporation while the associated transceiver 524 may comprise an SN74AVC1T45 single-bit dual-supply bus transceiver available from Texas Instruments, Inc. Transistor 526 may also be a DMP216 P-channel enhancement mode MOSFET available from Diodes Inc.

Figure 5E:
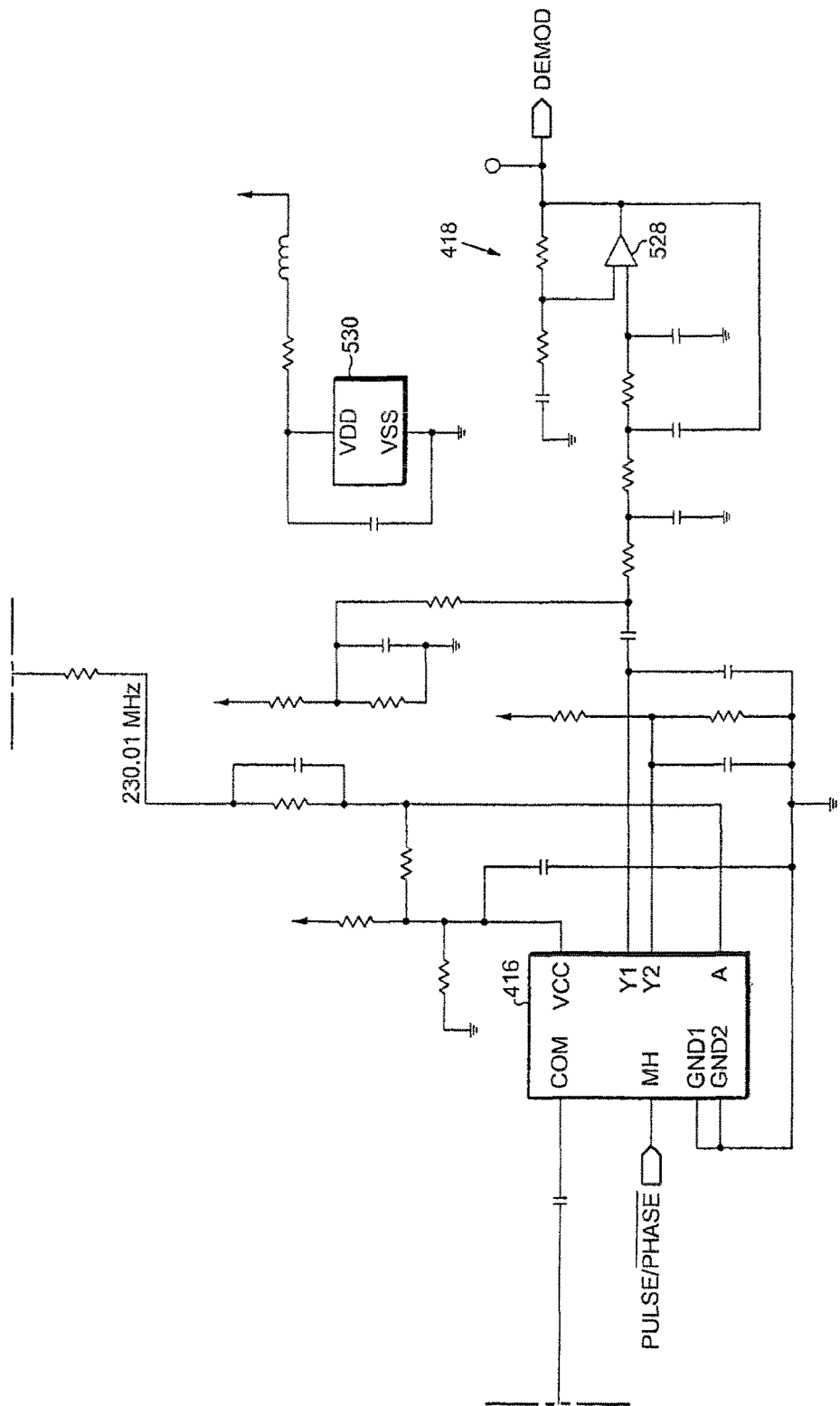

Referring now to FIG. 5E, the mixer 416 and low pass filter (LPF) 418 (FIG. 4) are shown in greater detail along with some of their associated circuitry. The mixer 416 may comprise an SN74AUG2G53 SPDT analog switch as sampling gates 430 and 432. Op amps 528 and 530 may both be conveniently furnished as MCP6284 devices from Microchip Technology, Inc.

Figure 5F:
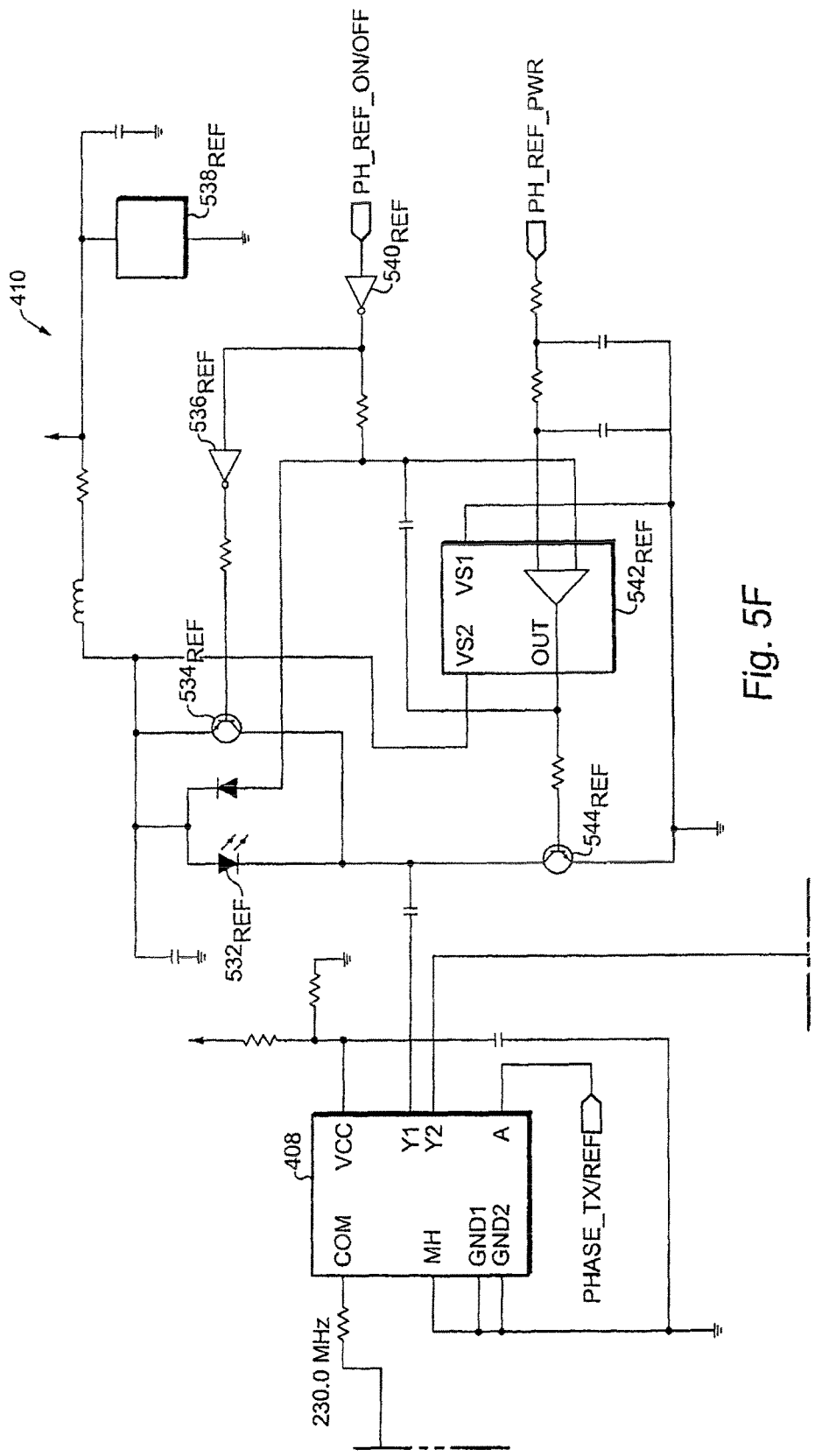

With reference additionally now to FIG. 5F, the switch 408 and phase reference block 410 are shown in greater detail. As before, switch 408 may be furnished as an SN74AUG2G53 device. The phase reference block 410 comprises a laser light emitting diode $532_{REF}$ while transistors $534_{REF}$ and $544_{REF}$ may comprise MMDT3946 complementary NPN/PNP small signal transistors available from Diodes, Inc. Inverters $536_{REF}$, $538_{REF}$ and $540_{REF}$ may be furnished as portions of SN74LVC2G14 dual Schmitt-trigger inverters available from Texas Instruments, Inc. Amplifier $542_{REF}$ may be provided as an FAN4931 rail-to-rail I/O CMOS amplifier device available from Fairchild Semiconductor Corp.

Figure 5G:
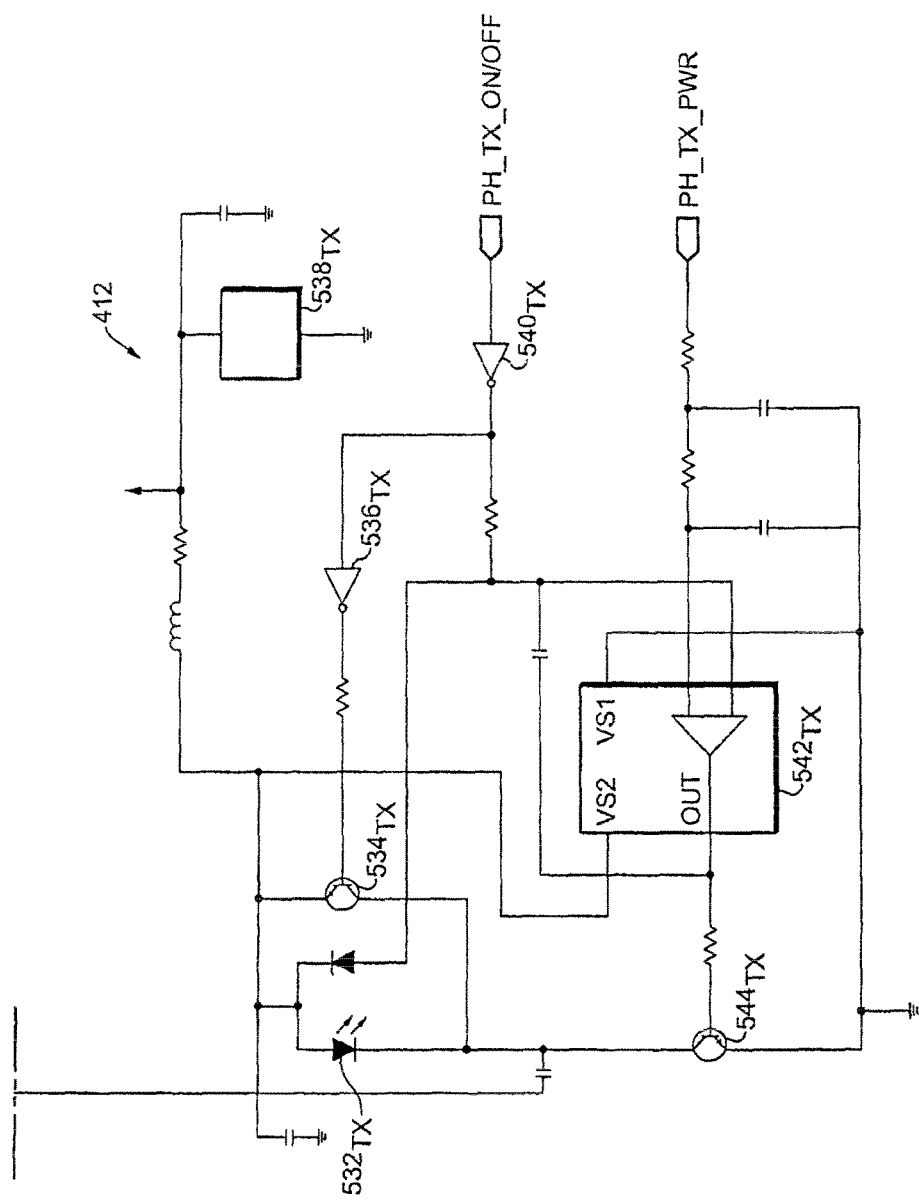

Referring additionally to FIG. 5G, the phase transmission block 412 (FIG. 4) is also shown in greater detail. The phase transmission block 412 is functionally identical to the phase reference block 410. The phase transmission block 412 comprises a laser light emitting diode $532_{TX}$ while transistors $534_{TX}$ and $544_{TX}$ may comprise MMDT3946 complementary NPN/PNP small signal transistors. Inverters $536_{TX}$, $538_{TX}$ and $540_{TX}$ may be furnished as portions of SN74LVC2G14 dual Schmitt-trigger inverters. Amplifier $542_{TX}$ may also be provided as an FAN4931 rail-to-rail I/O CMOS amplifier device.

With reference additionally now to FIGS. 6A through 6G inclusive, greater structural detail of the representative device 400 of the preceding figures is shown. With respect to FIGS. 6A and 6B in particular, connection points for the serial wire debug (SWD) port 444 and liquid crystal display (LCD) 446 (FIG. 4) are shown in addition to the connection point for an LCD backlight. With particular reference to FIGS. 6C, 6D, 6E and 6F, the input/output (I/O) and other pin connections to the microcontroller (MCU) 402 (FIG. 4) are shown. In the particular representative embodiment of the present invention illustrated and described, the MCU 402 may be conveniently furnished as a Kinetis K20 device available from Freescale Semiconductor, Inc. which includes on-board analog-to-digital (ADC) as well as digital-to-analog (DAC) converter and pulse width modulation (PWM) functionality.

Figure 6B:
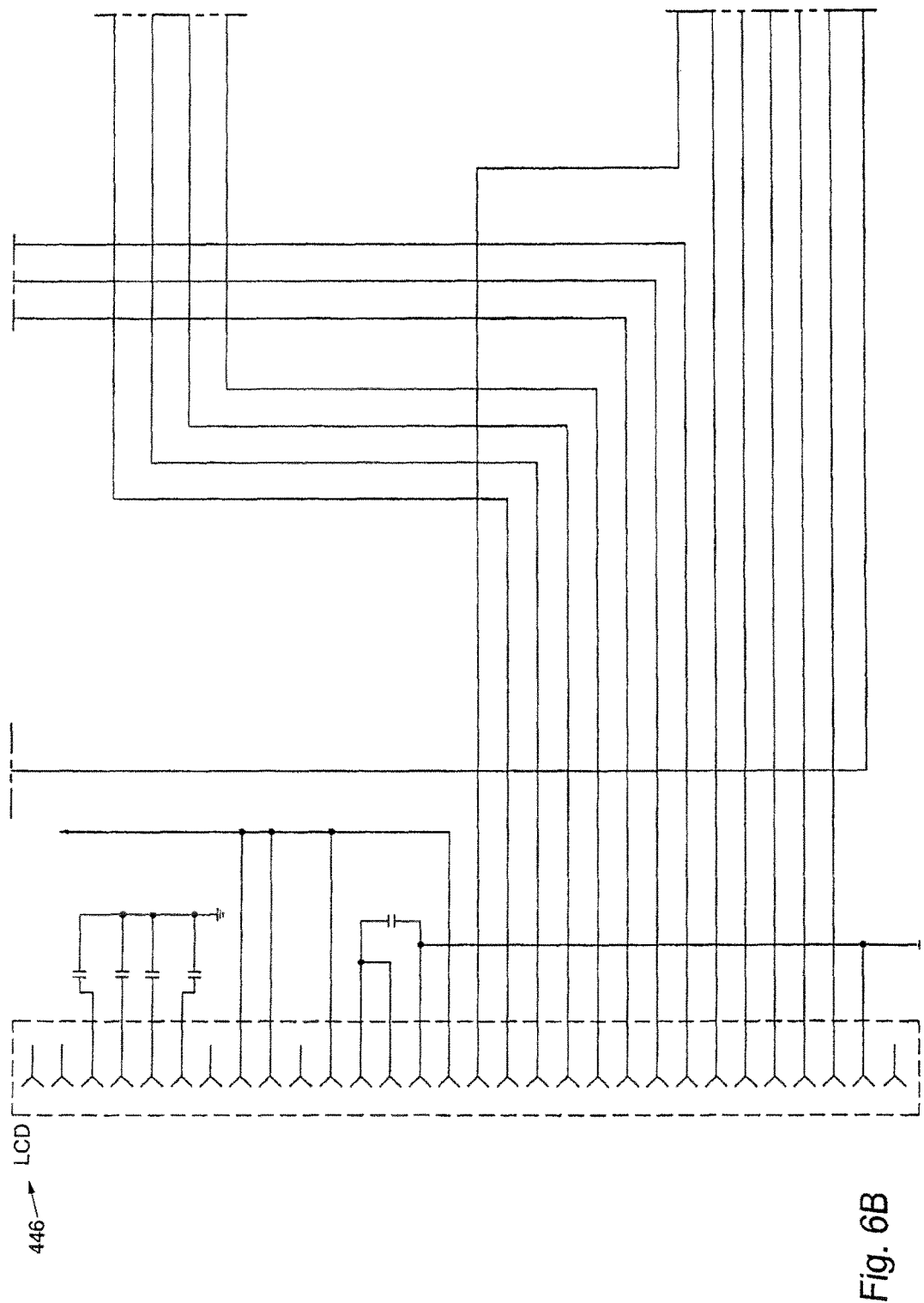
Figure 6C:
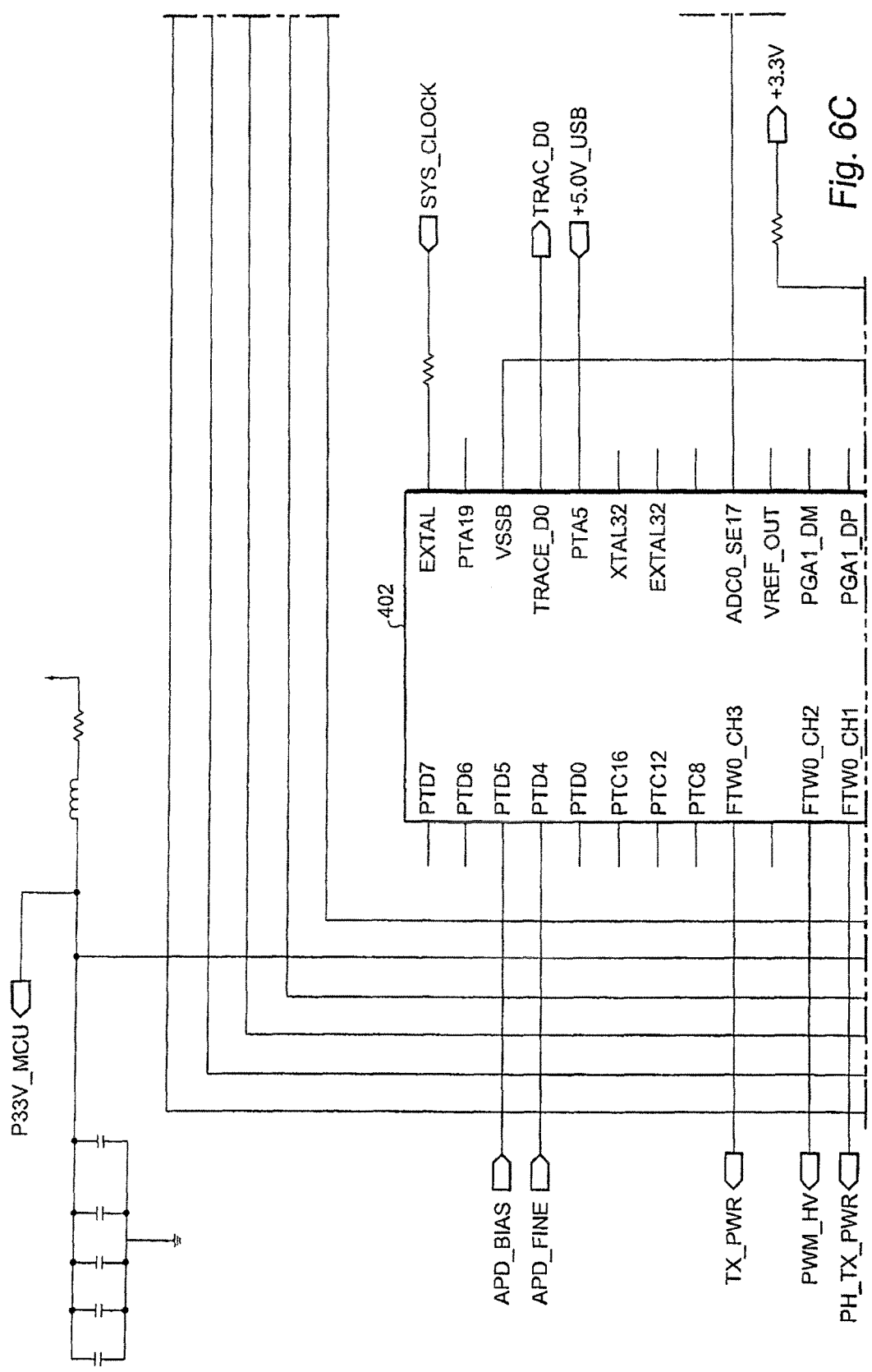
Figure 6D:
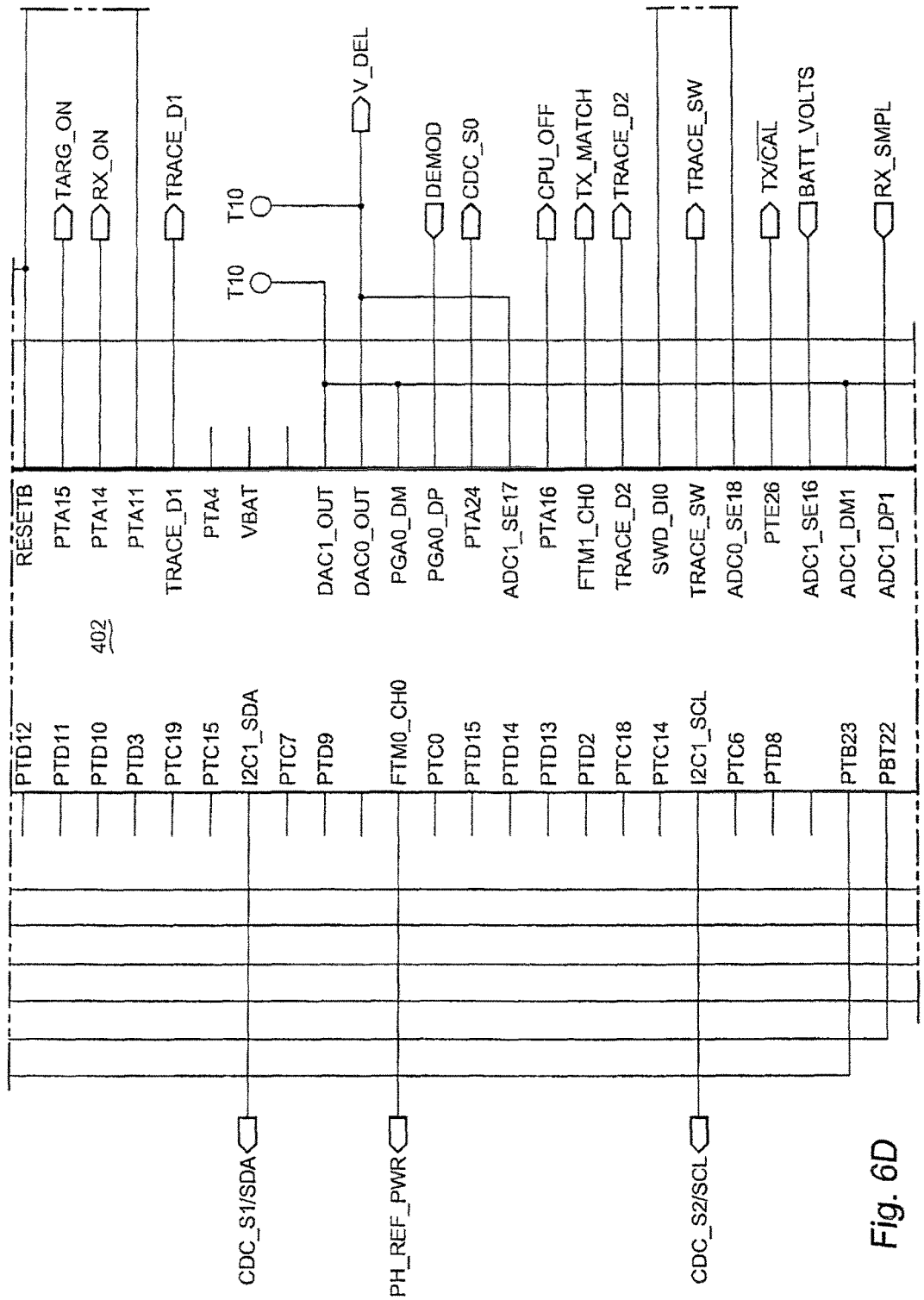
Figure 6E:
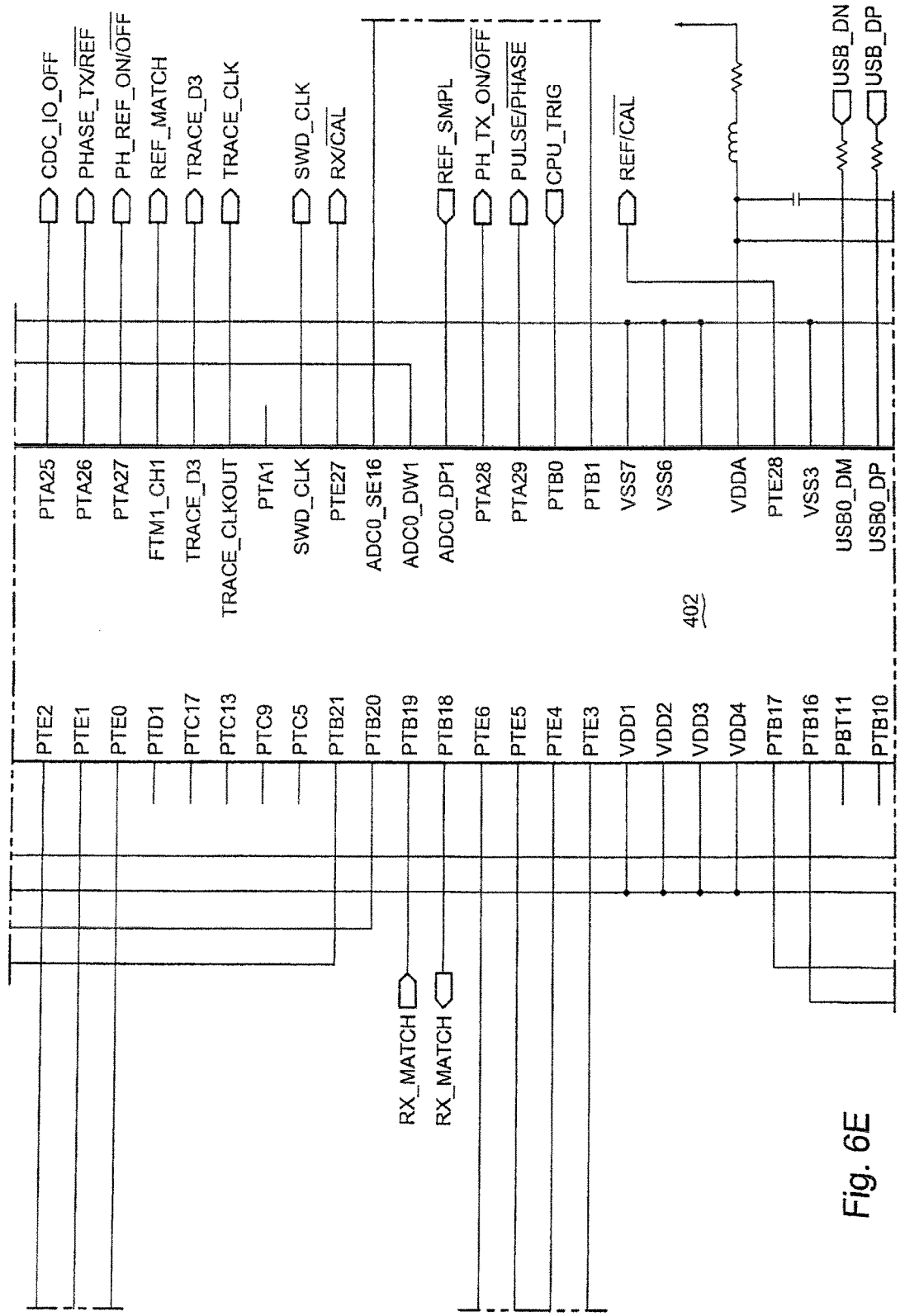
Figure 6F:
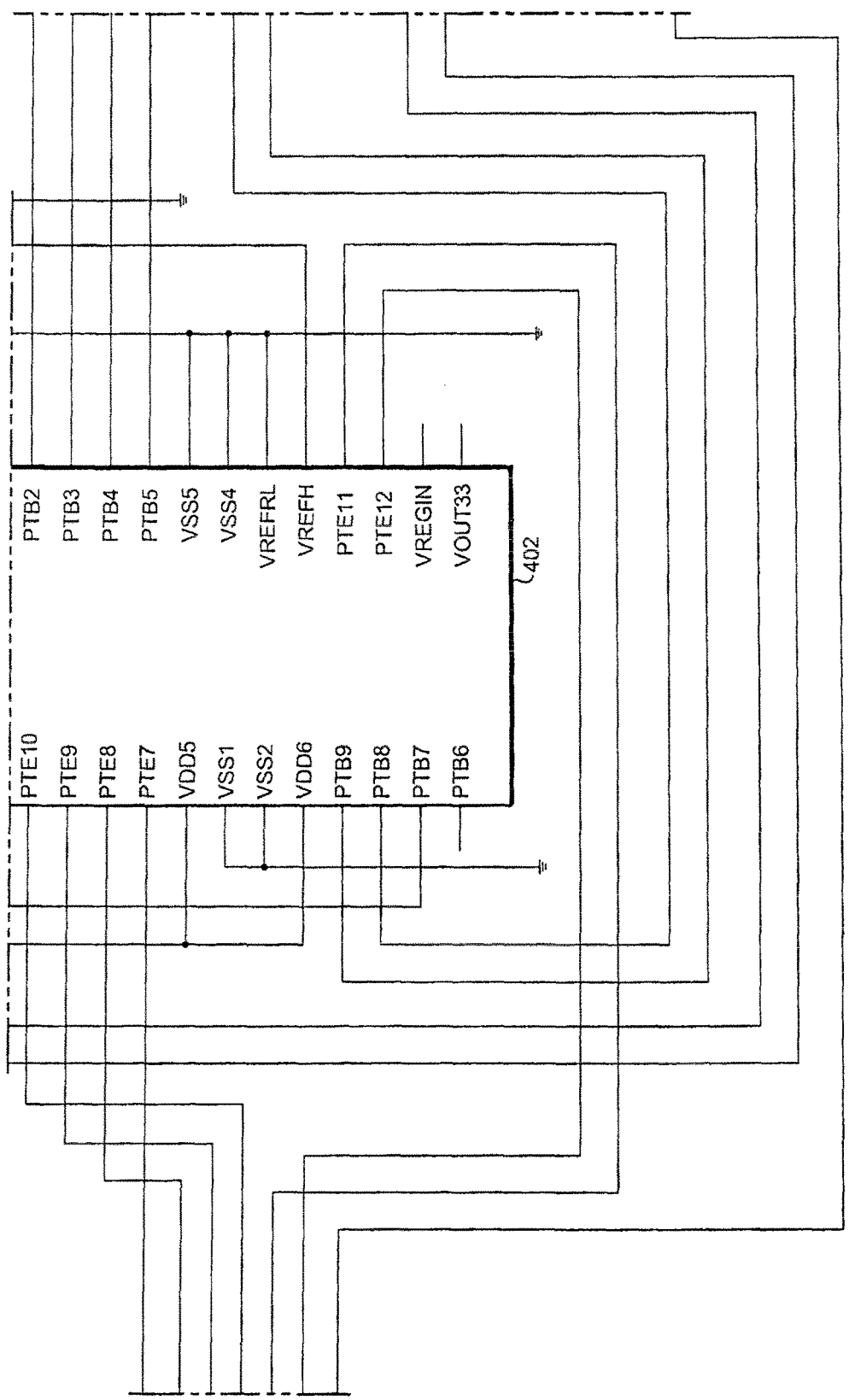
Figure 6G:
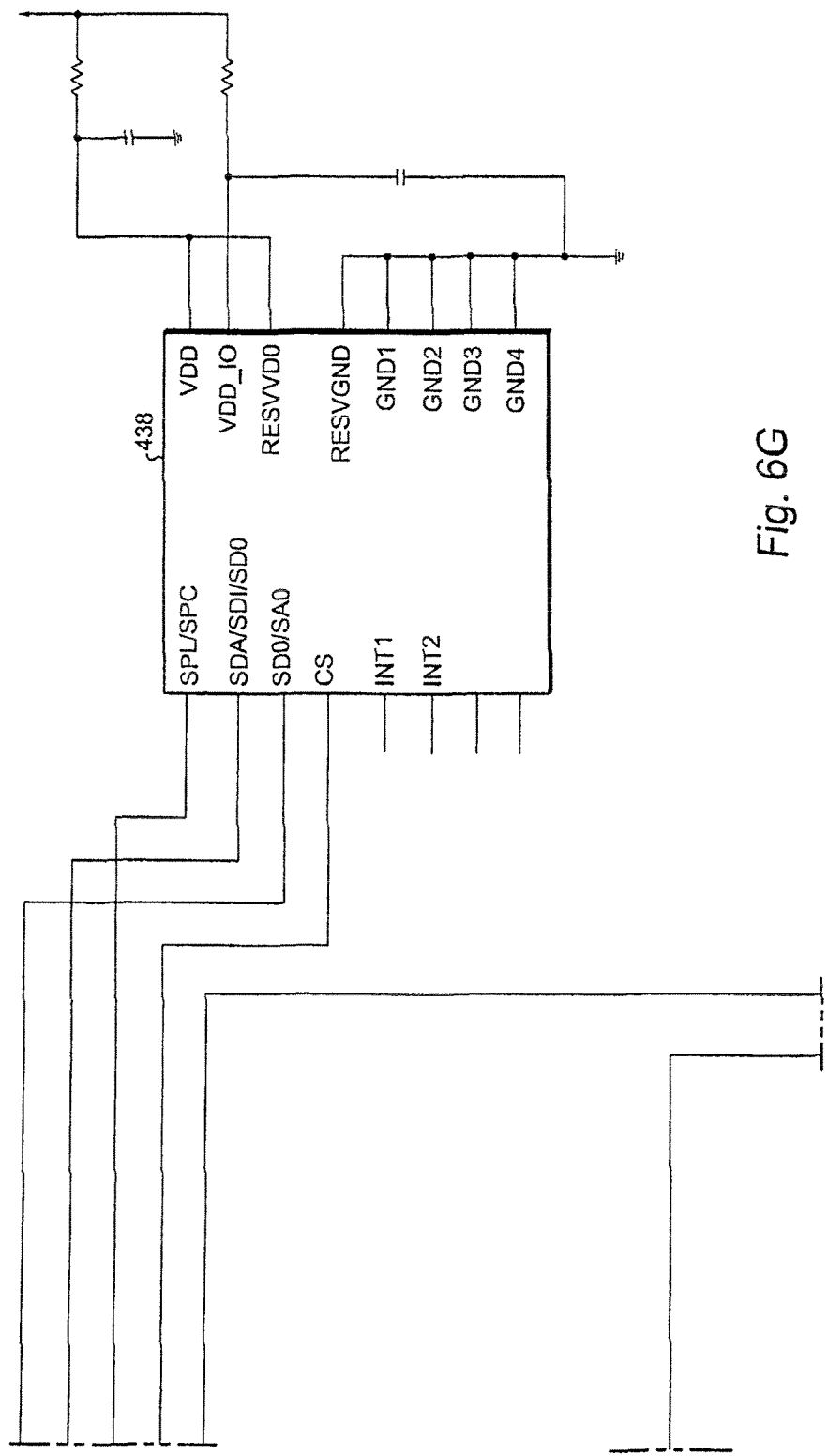
Figure 6H:
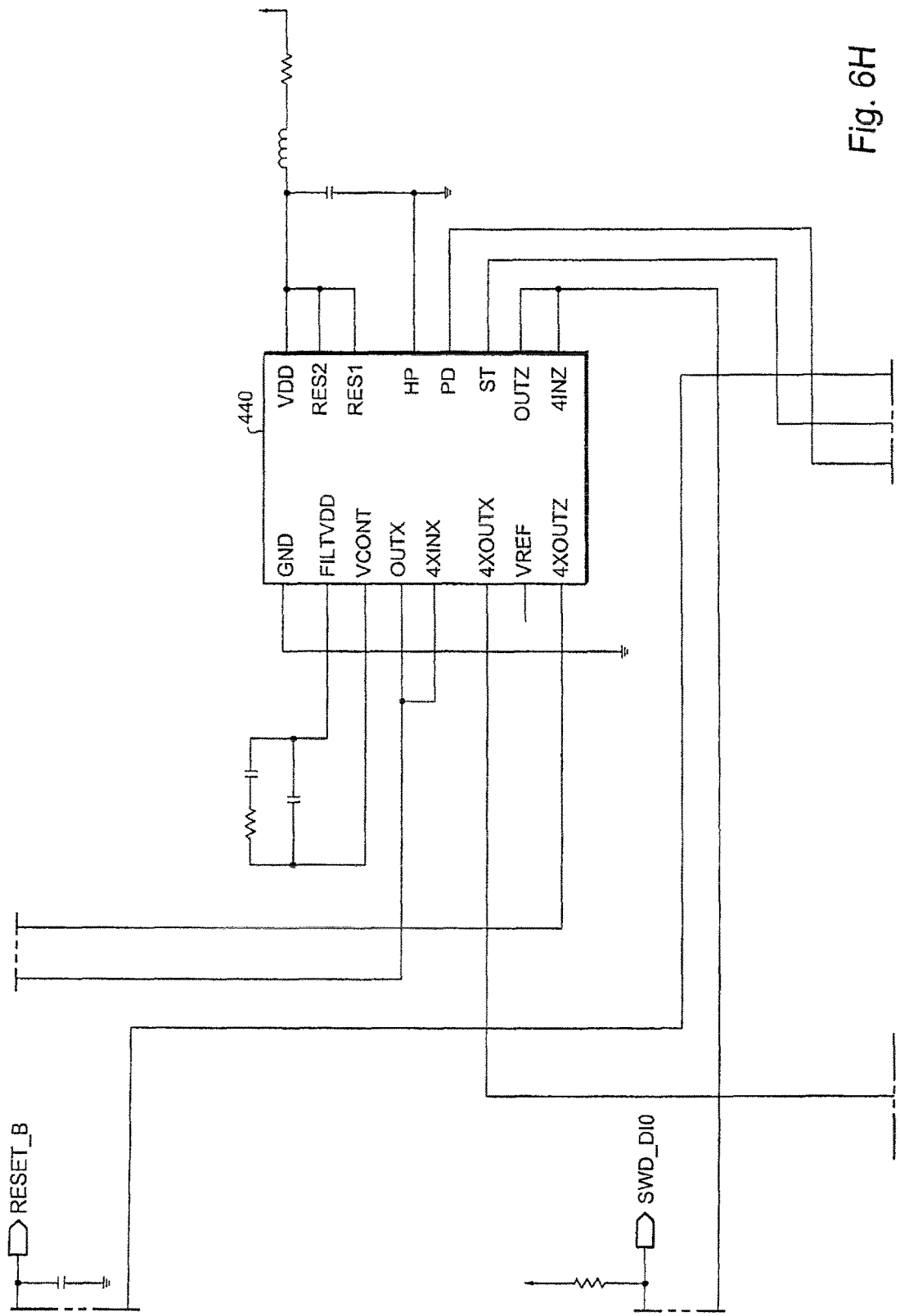
Figure 61:
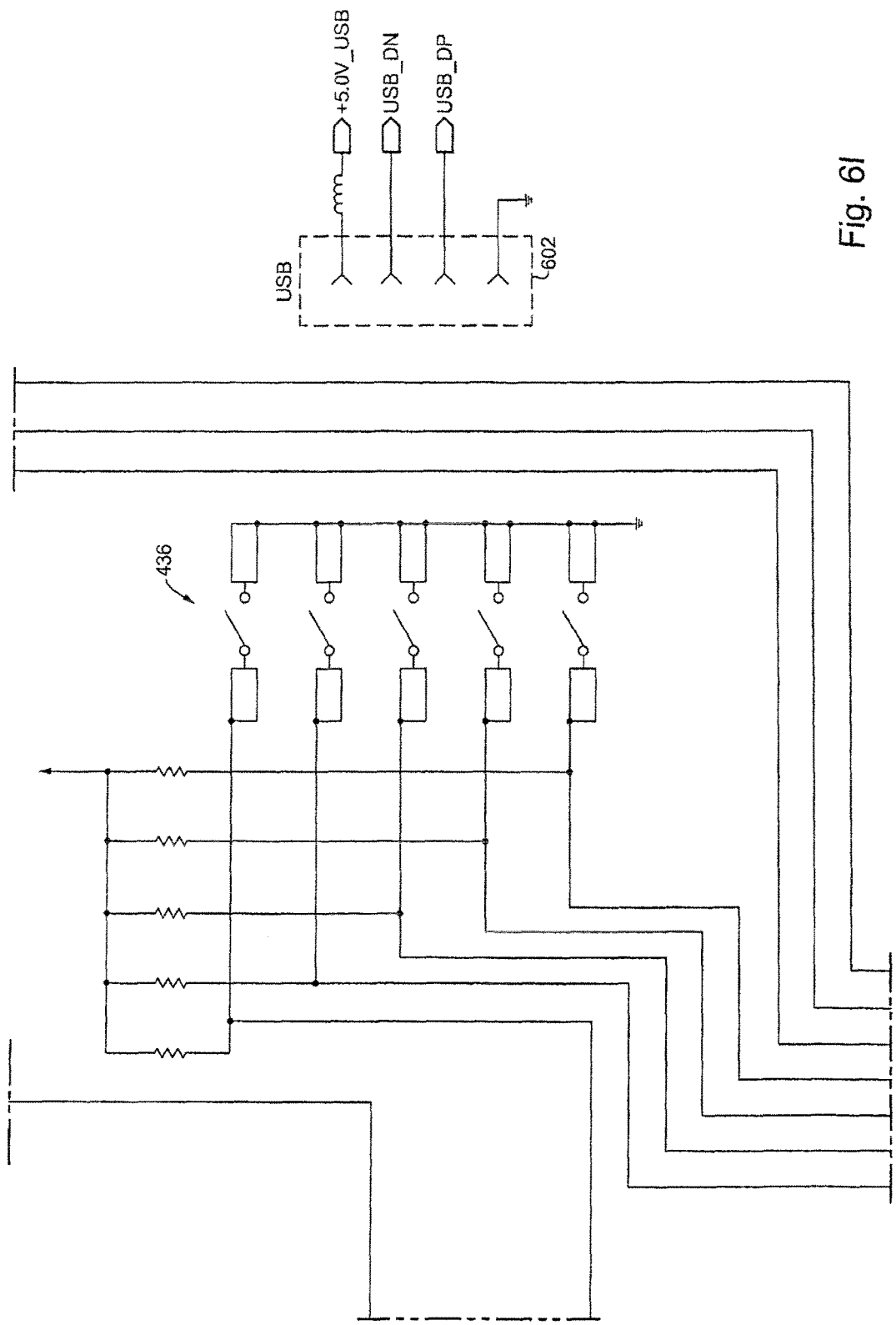

With particular reference to FIG. 6G, the inclinometer 438 (FIG. 4) and associated circuitry is shown in grater detail. The inclinometer 438 may be conveniently provided as an LIS331 DLH MEMS digital output motion sensor available from STMicroelectronics, Inc. With reference also now to FIG. 6H, the rate gyro 440 (FIG. 4) and associated components is illustrated. The rate gyro 440 may be furnished as an LPY503AL MEMS motion sensor also available from STMicroelectronics, Inc.

Figure 6J:
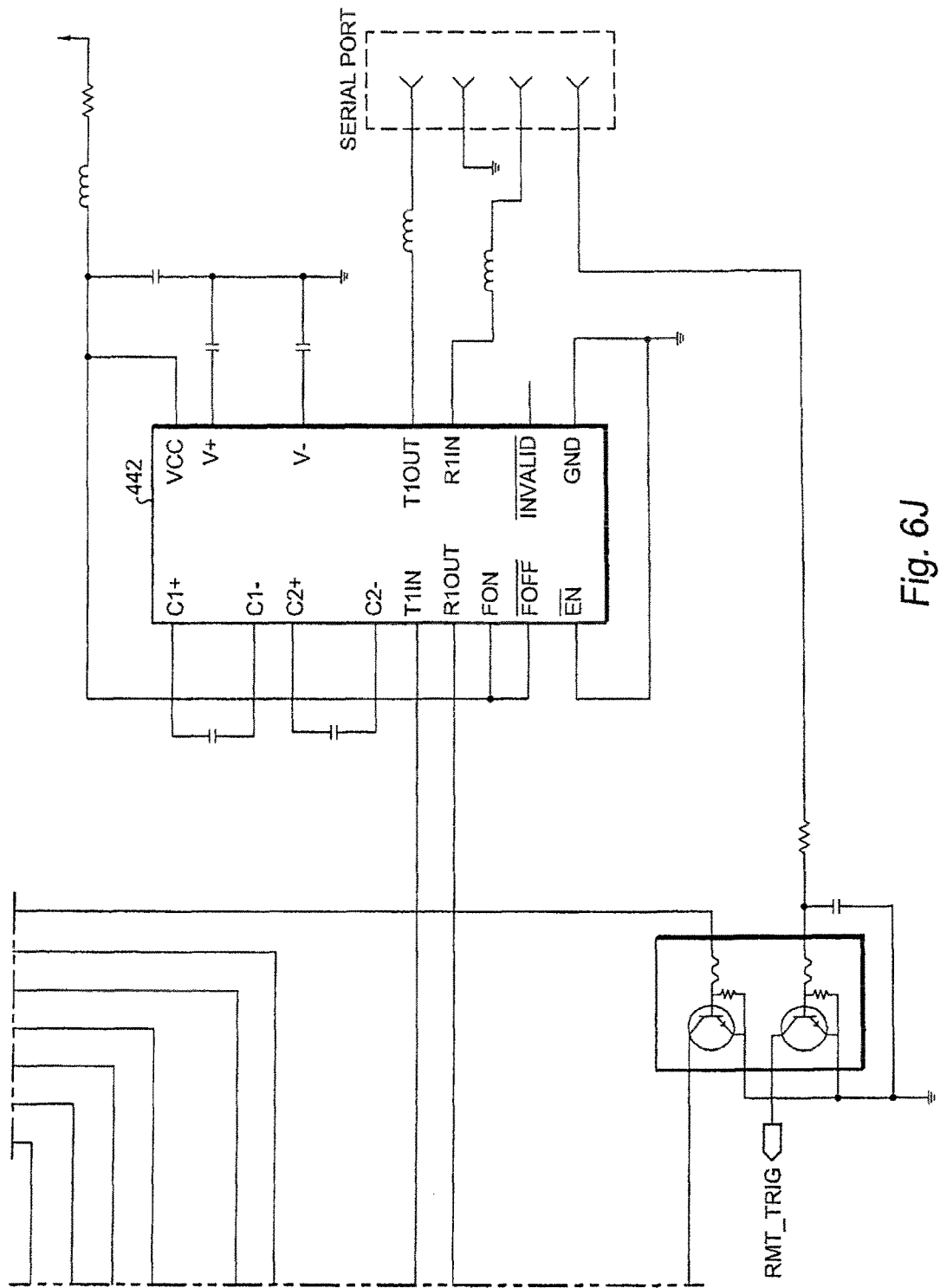

Referring now to FIG. 6I, the keypad 436 (FIG. 4) is shown in schematic detail in addition to a USB port 602 which couples to the K20 MCU 402 previously described. Referring also now to FIG. 6J, the serial port 442 is illustrated in greater detail and may comprise an ICL3221RS-232 transmitter/receiver device available from Intersil Americas, Inc.

With reference additionally now to FIGS. 7A through 7E inclusive, greater structural detail of the representative device 400 of the preceding figures is shown. With respect to FIG. 7A in particular, the fire switch 434 (FIG. 4) is shown along with some associated circuitry. The fire switch 434 initiates the transmission of laser signals from the phase transmission block 412 and pulse transmission block 448 when depressed by a user of the device 400 once aimed at a target. Active components illustrated include Schmitt-trigger devices 702, 704, 706, 708 and 710 which may be furnished as 74LV132 quad 2-input NAND Schmitt-trigger devices available from NXP Semiconductors. Regulator 712 may be supplied as an LM1117 low-dropout linear regulator available from National Semiconductor Corporation.

Figure 7B:
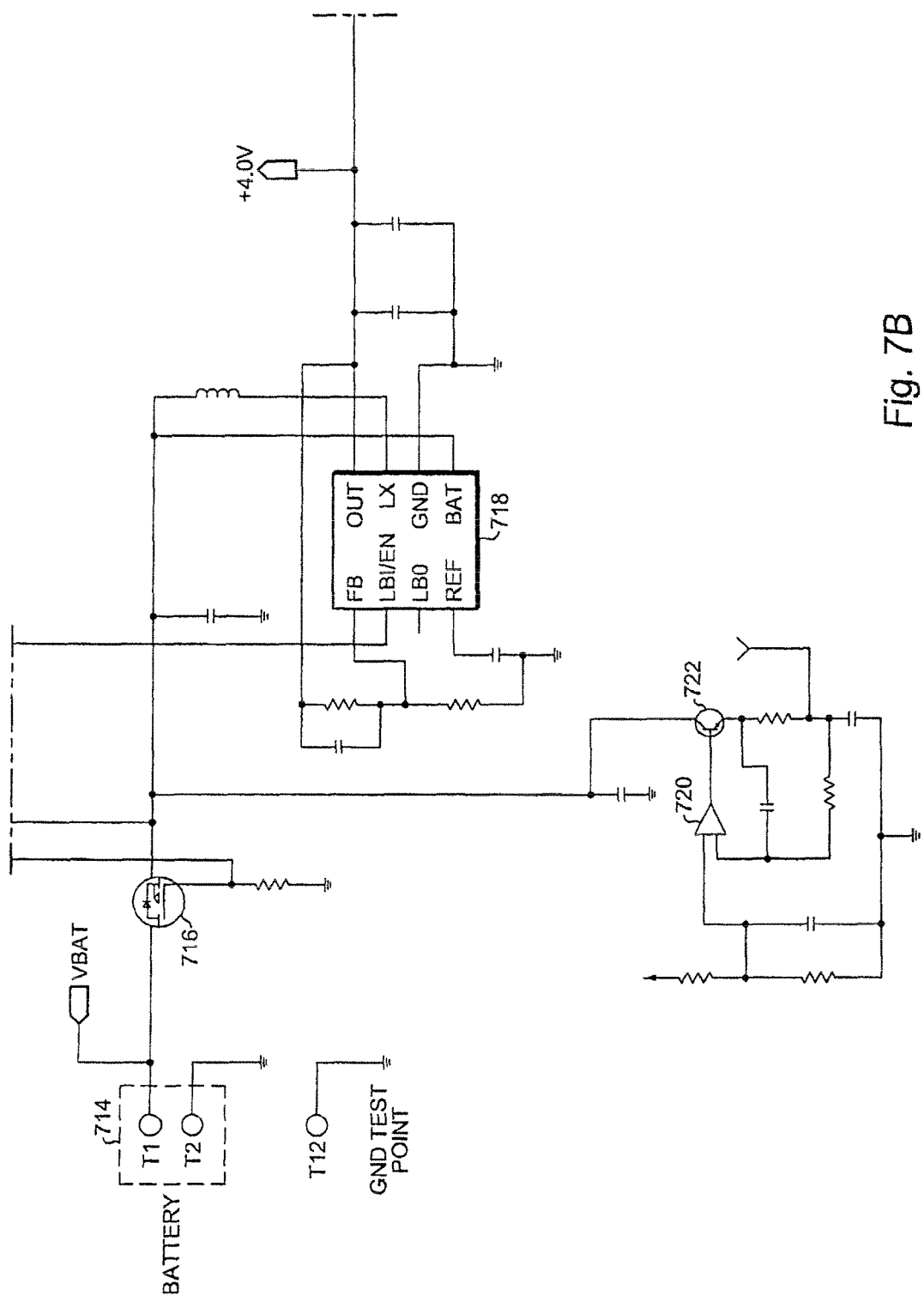

With reference now to FIG. 7B more detail as to certain aspects of the power supply for the device 400 are shown including the connection for a battery in a portable implementation. Transistor 716 may be furnished as an IRLML6401 power MOSFET supplied by International Rectifier Corporation. Switching converter 718 may be supplied as an NCP1421 step-up DC-DC converter available from ON Semiconductor. Op amp 720 may be implemented as an MCP6284 rail-to-rail op amp while transistor 722 may be an MMBT2222 NPN general purpose amplifier device available from Fairchild Semiconductor Corporation.

Figure 7C:
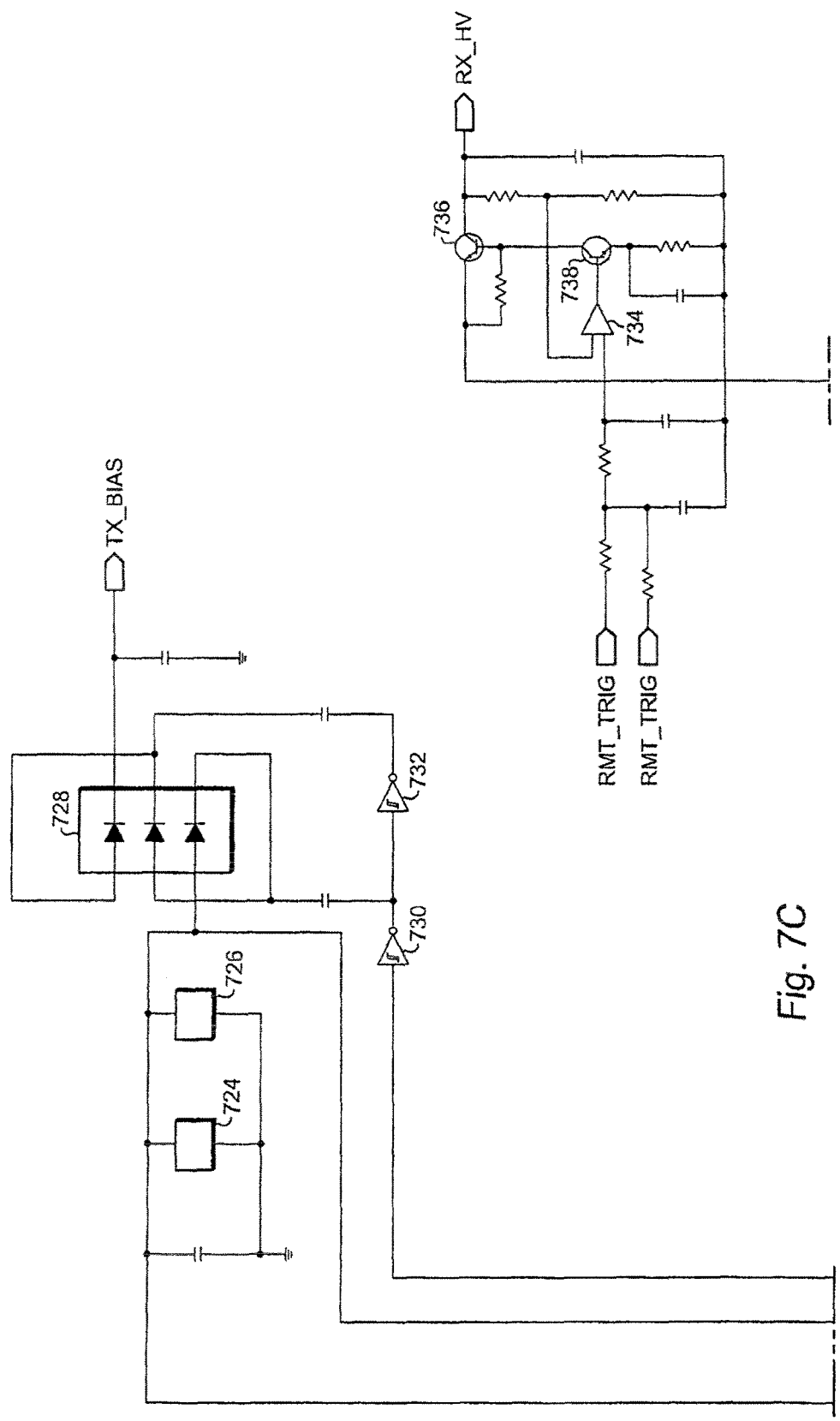

Referring now to FIG. 7C, further portions of the power supply for the device 400 are shown. Inverters 724, 730 and 732 may be supplied as portions of 74AC14 hex inverters with Schmitt-trigger inputs also available from Fairchild Semiconductor Corporation. Device 726 may be a 74VHC123 CMOS monostable multivibrator available from Toshiba America Electronic Components while the diode array 728 may be furnished as a BAT54TW Schottky Barrier diode array available from Diodes, Inc. Op amp 734 may be an MCP6284 rail-to-rail op amp while transistor 736 may be furnished as an MMBTA92 small signal PNP transistor available from STMicroelectronics, Inc. and transistor 738 may be an MMBTA42 NPN high voltage amplifier device available from Fairchild Semiconductor Corporation.

Figure 7D:
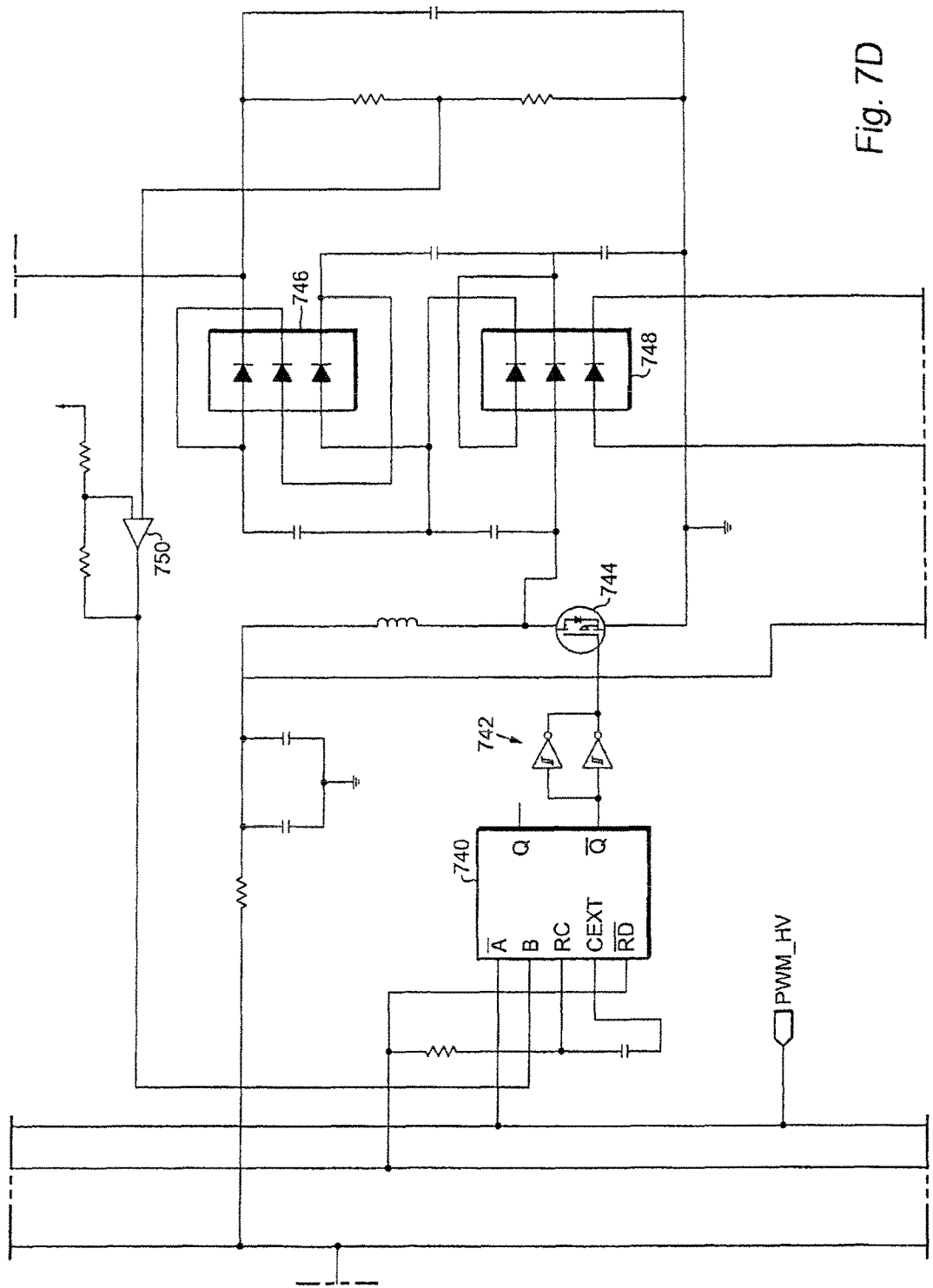

With reference additionally now to FIG. 7D further details of the power supply for the device 400 are shown including the charge pump. Device 740 may also be furnished as a 74VHC123 CMOS monostable multivibrator as was device 726. Inverters 742 may also be portions of 74AC14 hex inverters as were inverters 724, 730 and 732. Transistor 744 may be supplied as an IRLML0100TR power MOSFET available from International Rectifier Corporation. while diode arrays 746 and 748 may be supplied as BAS16VY triple high-speed switching diodes available from NXP Semiconductors. Op amp 750 may be supplied as an MCP6284 rail-to-rail op amp.

Figure 7E:
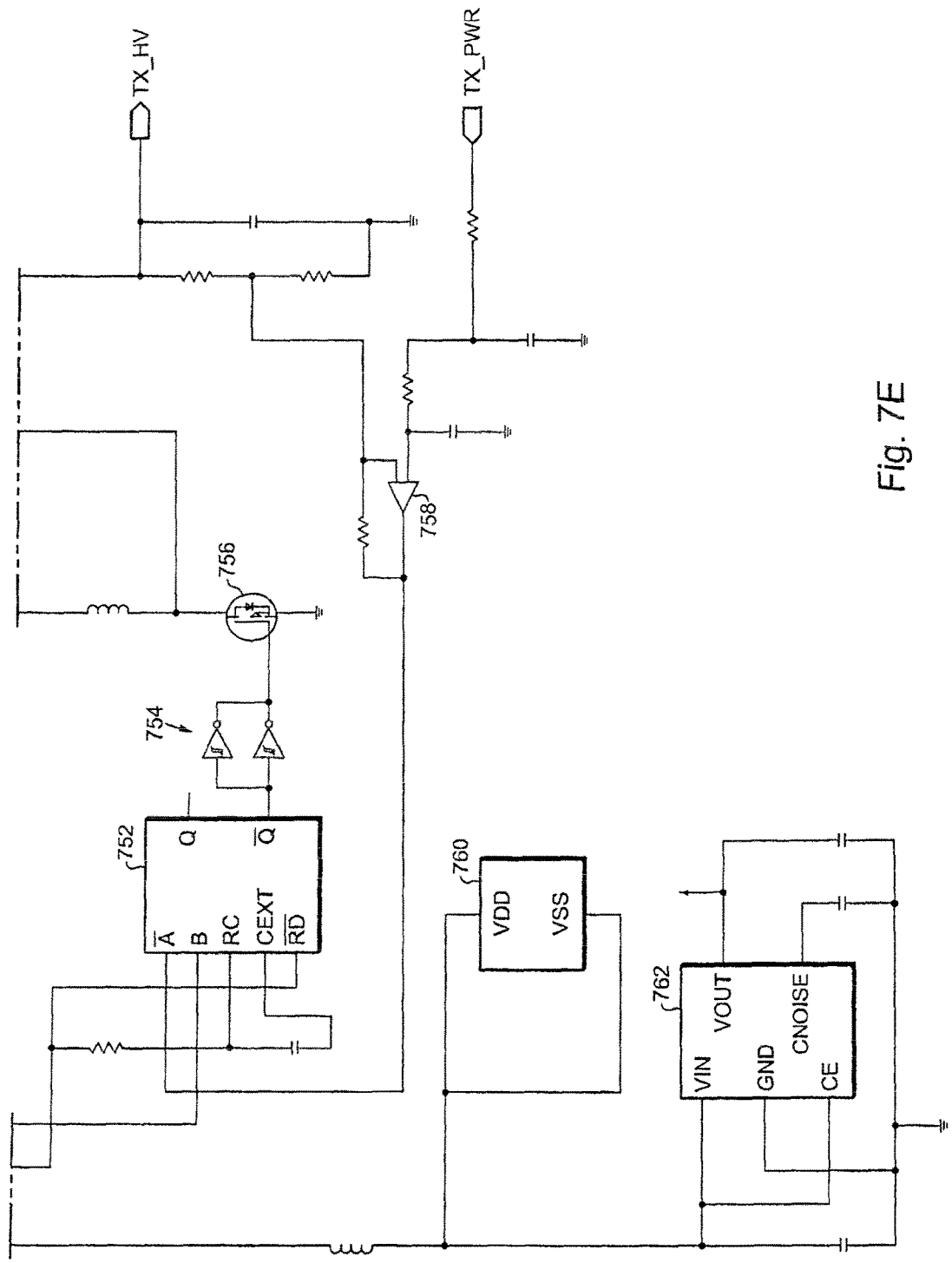

Referring additionally now to FIG. 7E still further details of the power supply for the device 400 are shown. Device 752 may also be furnished as a 74VHC123 CMOS monostable multivibrator as was device 740 while inverters 754 may also be portions of 74AC14 hex inverters as were inverters 742. Transistor 756 may also be supplied as an IRLML0100TR power MOSFET while op amps 758 and 760 may be an MCP6284 rail-to-rail op amp. Regulator 762 may be supplied as an NCP3985 micropower low-noise high power supply rejection ratio (PSRR) ultra-low dropout BiCMOS voltage regulator available from On Semiconductor.

In operation, the phase portion of the system utilizes the fractional N PLL synthesis circuit 406 (FIG. 4) which allows for a direct down conversion from a high frequency of 230.0 MHz to the intermediate frequency of 10.0 KHz. That combines with an analog switch 408 which directs the 230.0 MHz signal to either the phase transmission (PHASE_TX) block 412 which sends a laser beam out of the device 400 or the phase reference (PHASE_REF) block 410 which generates an internal reference beam to the detector.

The fractional N PLL synthesis circuit 406 also generates a 230.01 MHz signal, which provides the 10 kilohertz difference. The 230.01 MHz signal is directed to an analog mixer, or down converter, 416. The signal which then is returned through the laser receiver 414 has a frequency of 230.0 MHz while the modulator receives the 230.01 MHz signal. The difference frequency comes down through the low-pass filter network 418 as a 10 kilohertz signal and this frequency contains the phase information that was determined by the difference between the emitted beam, time of flight to the target and back. In this manner, the same phase angle information that is being sought is preserved at a much lower frequency which is then significantly more cost effective to measure and analyze where fractional hundredths of a degree are involved.

The whole system is also synchronized to the clock source 204 so the sampling can be synchronized precisely to that frequency. The MCU 402 utilized in the particular implementation shown has an on-board analog-to-digital (ADC) conversion capability and all operations relate to the same system clock. In this regard, everything is then phased locked, so that when sampling is done to determine the phase angle, nothing can drift inasmuch as everything is linked to the common clock source 204. Stated another way, the down conversion frequency and the data sampling frequency are all phase-locked obviating the possibility of drift over time and temperature that would otherwise require significantly more expensive oscillators and controls in order to accomplish a similar function. It should be noted that an external ADC could also be used instead along with an appropriately synchronized clock.

In purely phase-based laser systems multiple frequencies and multiple steps are required to resolve the phase ambiguity between the emitted signal and the return reflected signal. With the frequencies involved, the wave length of the signal is about 0.65 meters round trip so in the measurement of the distance to a target on the order of 20 meters away, there would only be 30 whole cycles in which to measure the phase angle cycle. Accomplishing this measurement involves many additional steps and circuit complexity to run different frequencies to resolve the phase ambiguity, all of which would take a significant amount of time away from performing a high-accuracy measurement. By combining a phase-based laser system with a pulsed infrared system one can then much more quickly resolve the phase ambiguity as only one or two pulses of the infrared is then accurate enough to determine exactly what the whole number of cycles are. This then allows for a much faster overall resolution plus the combined benefits of providing the optimized high-frequency, short-range or high accuracy plus the slightly lower accuracy for much longer range.

With respect to the pulsed infrared portion of the device 400, sampling gates 430 and 432 are high-speed analog switches. In operation, the MCU 402 generates a TX_MATCH signal to flip-flop 424, a REF_MATCH signal to flip-flop 426 and a RX_MATCH signal to flip-flop 428. The timing of the ports on the MCU 402 has approximately a +/−100 to 200 picoseconds of uncertainty while what is required is closer to 10 picoseconds of uncertainty or about 1.5 millimeters. Therefore, the port pins of the MCU cannot be utilized directly at the very high levels of accuracy or resolution being sought. The flip-flops 424, 426 and 428 are then utilized as synchronizers.

The sequence of events for a measurement begins with the initiation of the TX_MATCH signal at a nominal time $T_0$ (Tzero) through flip-flop 424 to the programmable delay circuit 420 with the V_DEL signal coming from a digital-to-analog converter (DAC) onboard the MCU 402. In operation, the V_DEL signal creates a ramp and it should be noted that, alternatively, the onboard DAC could also be an external DAC. The output of the delay circuit 420 is switched through demultiplexer 422 to fire the laser pulse and to form a calibration reference through buffer 516 (FIG. 5B) for sampling gates 430 and 432.

The delay circuit 420 is calibrated so that one clock period can be determined and, in calibration mode using the REF/$\overline{CAL}$ channel, the delay is moved around until the REF_MATCH signal is moved by exactly one clock period. This enables the determination of the voltage range between V_DEL high and V_DEL low with the latter being the clock period minus one. The higher the voltage on V_DEL, the greater the delay so the clock must be increased to make it match. Operating V_DEL between its high and low positions enables the determination that the delay circuit 420 has changed delay by exactly one clock period and this same operation is performed on the reference channel for REF_MATCH and the receiver channel for RX_MATCH. Since a common signal is applied to both, any small temperature differences between the two channels is factored out. In TX mode, the laser pulse is fired toward the target and the laser pulse generates a fixed firing point or reference signal to sampling gate 430. The reference signal TX REF is taken from the actual fire circuit and represents the exact point at which the laser diode fires.

The biasing network employed in the device 400 ensures that the signals remain within the correct dynamic range. Causing sampling gate 430 to enter the reference mode, and by adjusting the reference match REF_MATCH count and the level of V_DEL, it is possible to measure exactly when the laser fired. Once the laser is fired with the pulse being emitted, we now have an exact time which, by monitoring the firing, varying the delay, firing off a sequence of laser pulses and varying the delay, it can be determined exactly when the laser pulse fired match. Exactly the same thing can then be done with the receive signal. The receiver is placed into RX mode, and RX_MATCH and V_DEL are adjusted to measure the RX sample and find exactly when the signal was returned from the target. This provides a whole clock number for a REF_MATCH plus the delay setting in a fractional count of the clock, which represents the point in time when the laser pulse was emitted. We now have an exact match for the receiver in terms of whole clock periods and a fractional part when the laser pulse was sent to the target, the difference being the actual flight time between transmission and reception. In this manner it is possible to calibrate out all the different temperature coefficients associated with the delay circuit 420, transmit delays and the sampling gates.

The MCU 402 employed in the representative embodiment of the present invention disclosed comprises the on-board DACs, the on-board ADCs and provides the on-board PWM. Keypad 436 input is shown in FIG. 6I and there are also provided inputs for the tilt sensor 438 (FIG. 6G) and a rate gyro 440 (FIG. 6H). While a compass might also be included as a part of the device 400 such may not be as effective as rate gyro 440 in the area of construction sites and other places contaminated with relatively large ferrous objects.

With particular reference to FIG. 7B, switching converter 718 is the primary device which regulates boost from the battery. Additional power supply components include Schmitt-trigger devices 704, 706, 708 and 710 (FIG. 7A) which are used for power on/off and fire switch detection and various power supplies. Regulator 762 (FIG. 7E) is employed as a 3.3 volt post regulator because the logic components of the device 400 operate at 3.3 volts. A separate discrete device 1.8 volt regulator comprising op amp 720 and transistor 722 (FIG. 7B) is also utilized which provides the core voltage for the clock oscillator chip 522 as well as other components.

The TX circuit has an extra line (TX_BIAS; FIG. 7C) which supplies an intermediate voltage of approximately 7.5 volts generated from a 4 volt rail. This allows the TX circuit itself to run faster. For the basic transmission high voltage, a simple inductor flyback booster circuit is provided comprising device 752 (FIG. 7E) which generates control pulses. Inverters 754 boost up the drive level while transistor 756 and the associated inductor comprise the flyback booster circuit with diode array 748 forming the output diode. The TX power is controlled by pulse width modulation coming in on TX_PWR signal (FIG. 7E) from the MCU 402 which is proportional to TX_HV. The receiver utilizes the same device 740 (FIG. 7D) with a fixed pulse width and 3-stage diode charge pump on the output of the flyback converter to achieve 300 volts. A feedback loop comprises two resistors in conjunction with op amp 750 to control the switching to generate 300 volts raw for the RX. A post-linear regulator comprising transistors 736 and 738 with op amp 734 (FIG. 7C) regulates the 300 volts down to substantially between 200 volts to 280 volts which is a typical bias range. The PWM scheme is set up to provide approximately 1 in 300 resolution, or just 1 volt roughly at 300 volts. However, the 1 volt is then split about 300 levels finer, or on the order of 30 millivolts, to provide very fine control for the particular type of avalanche photodiode (APD) which might be utilized in a tape laser which is a very sharp breakdown device. For that reason the bias point must be held within a fraction of a volt in order to achieve proper operation.

Overall, a range-finding instrument employing the system and method of the present invention provides significantly improved measurement resolution, at low cost with a greater distance measurement capability. Further, it can be employed in dusty or industrial environments where the transmitted CW beam becomes obscured or is otherwise interfered with on a regular basis.

While there have been described above the principles of the present invention in conjunction with specific apparatus, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

As used herein, the terms "comprises", "comprising", or any other variation thereof, are intended to cover a non-exclusive inclusion, such that a process, method, article, or apparatus that comprises a recitation of certain elements does not necessarily include only those elements but may include other elements not expressly recited or inherent to such process, method, article or apparatus. None of the description in the present application should be read as implying that any particular element, step, or function is an essential element which must be included in the claim scope and THE SCOPE OF THE PATENTED SUBJECT MATTER IS DEFINED ONLY BY THE CLAIMS AS ALLOWED. Moreover, none of the appended claims are intended to invoke paragraph six of 35 U.S.C. Sect. 112 unless the exact phrase "means for" is employed and is followed by a participle.

What is claimed is:

1. A rangefinding instrument comprising:
   a pulse-based signal transmission system comprising an infrared laser diode;
   a phase-based signal transmission system comprising a visible light emitting source; and
   at least one distance computing circuit coupled to said pulse-based and phase-based transmission systems operative to determine a range to a target based upon a time of flight of said pulse-based signals and a phase shift of said phase-based signals reflected from said target, wherein an indicated range of said instrument to said target is based upon a more accurate range to said target as determined by said at least one computing circuit based upon either said phase-based signals or said pulse-based signals.

2. The rangefinding instrument of claim 1 wherein said visible light emitting source is modulated to produce a continuous wave signal output.

3. The rangefinding instrument of claim 2 wherein said continuous wave signal output is gated "on" and "off" to produce a discreet series of continuous wave signals.

4. The rangefinding instrument of claim 1 wherein said at least one distance computing circuit detects an existence of interfering material in determining said range to said target based upon said phase shift of said phase-based signals reflected from said target and computes said range to said target based upon a time of flight of said pulse-based signals.

5. The rangefinding instrument of claim 1 wherein said at least one distance computing circuit further comprises:
   a detector for receiving said pulse-based signals and said phase-based signals reflected from said target.

6. A rangefinding instrument comprising:
   a pulse-based signal transmission system comprising an infrared laser diode;
   a phase-based signal transmission system comprising a visible light emitting source; and
   at least one distance computing circuit coupled to said pulse-based and phase-based transmission systems operative to determine a range to a target based upon a time of flight of said pulse-based signals and a phase shift of said phase-based signals reflected from said target, wherein said at least one distance computing circuit computes said range to said target based upon said phase shift of said phase-based signals reflected from said target and provides calibration information for computation of said range to said target based upon a time of flight of said pulse-based signals.

7. The rangefinding instrument of claim 6 wherein said visible light emitting source is modulated to produce a continuous wave signal output.

8. The rangefinding instrument of claim 7 wherein said continuous wave signal output is gated "on" and "off" to produce a discreet series of continuous wave signals.

9. The rangefinding instrument of claim 6 wherein said at least one distance computing circuit detects an existence of interfering material in determining said range to said target based upon said phase shift of said phase-based signals reflected from said target and computes said range to said target based upon a time of flight of said pulse-based signals.

10. The rangefinding instrument of claim 6 wherein said at least one distance computing circuit further comprises:
    a detector for receiving said pulse-based signals and said phase-based signals reflected from said target.

11. A method for determining range to a target comprising:
    transmitting a pulse-based signal to said target from an infrared laser diode;
    transmitting a phase-based signal to said target from a visible light emitting source;
    determining a range to said target based upon a time of flight of said pulse-based signal and a phase shift of said phase-based signal reflected from said target; and
    displaying said range to said target based upon a determination of which of said pulse-based or phase-based signals is considered to be most accurate.

12. The method of claim 11 wherein said transmitting said phase-based signal to said target is carried out by:
    modulating said visible light emitting source.

13. The method of claim 12 further comprising:
gating said modulated visible light emitting source "off" and "on".

14. The method of claim 11 further comprising:
detecting an existence of interfering material in determining said range to said target based upon said phase shift of said phase-based signals reflected from said target; and
computing said range to said target based upon a time of flight of said pulse-based signals.

15. The method of claim 11 further comprising:
providing a detector; and
receiving said pulse-based signals and said phase-based signals reflected from said target with said detector.

16. A method for measuring distance comprising:
emitting a continuous wave laser beam from a visible light emitting source toward a target;
emitting a pulsed laser beam from an infrared laser diode toward said target;
receiving reflections of said continuous wave laser beam and said pulsed laser beam from said target;
computing a distance to said target based on each of said emitted and reflected continuous wave and pulsed laser beams;
determining which of said computed distances is more accurate; and
indicating a range to said target based upon said more accurate range as determined by at least one computing circuit.

17. A rangefinding instrument comprising:
a pulse-based signal transmission system;
a phase-based signal transmission system; and
at least one distance computing circuit coupled to said pulse-based and phase-based transmission systems operative to determine a range to a target based upon a time of flight of said pulse-based signals and a phase shift of said phase-based signals reflected from said target, wherein an indicated range of said instrument to said target is based upon a more accurate range to said target as determined by said at least one computing circuit based upon either said phase-based signals or said pulse-based signals and wherein said at least one distance computing circuit detects an existence of interfering material in determining said range to said target based upon said phase shift of said phase-based signals reflected from said target and computes said range to said target based upon a time of flight of said pulse-based signals, said at least one distance computing circuit further identifying said existence of said interfering material to a user of said rangefinding instrument on a display.

18. A rangefinding instrument comprising:
a pulse-based signal transmission system;
a phase-based signal transmission system; and
at least one distance computing circuit coupled to said pulse-based and phase-based transmission systems operative to determine a range to a target based upon a time of flight of said pulse-based signals and a phase shift of said phase-based signals reflected from said target, wherein said at least one distance computing circuit computes said range to said target based upon said phase shift of said phase-based signals reflected from said target and provides calibration information for computation of said range to said target based upon a time of flight of said pulse-based signals and wherein said at least one distance computing circuit detects an existence of interfering material in determining said range to said target based upon said phase shift of said phase-based signals reflected from said target and computes said range to said target based upon a time of flight of said pulse-based signals, said at least one distance computing circuit further identifying said existence of said interfering material to a user of said rangefinding instrument on a display.

19. A method for determining range to a target comprising:
transmitting a pulse-based signal to said target from a laser diode;
transmitting a phase-based signal to said target;
determining a range to said target based upon a time of flight of said pulse-based signal and a phase shift of said phase-based signal reflected from said target;
displaying said range to said target based upon a determination of which of said pulse-based or phase-based signals is considered to be most accurate;
detecting an existence of interfering material in determining said range to said target based upon said phase shift of said phase-based signals reflected from said target;
computing said range to said target based upon a time of flight of said pulse-based signals; and
identifying said existence of said interfering material to a user of said rangefinding instrument on a display.

* * * * *